(12) United States Patent
Hirota

(10) Patent No.: US 9,883,150 B2
(45) Date of Patent: Jan. 30, 2018

(54) SOLID STATE IMAGING DEVICE, IMAGING DEVICE, AND ELECTRONIC DEVICE FOR CONTROL OF COLOR AND LUMINANCE RESOLUTIONS

(71) Applicant: SONY CORPORATION, Tokyo (JP)

(72) Inventor: Isao Hirota, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/913,505

(22) PCT Filed: Sep. 12, 2014

(86) PCT No.: PCT/JP2014/074243
§ 371 (c)(1),
(2) Date: Feb. 22, 2016

(87) PCT Pub. No.: WO2015/045913
PCT Pub. Date: Apr. 2, 2015

(65) Prior Publication Data
US 2016/0205359 A1 Jul. 14, 2016

(30) Foreign Application Priority Data
Sep. 25, 2013 (JP) .................. 2013-197871

(51) Int. Cl.
H04N 9/04 (2006.01)
(52) U.S. Cl.
CPC .................. H04N 9/045 (2013.01)
(58) Field of Classification Search
None
See application file for complete search history.

(56) References Cited

U.S. PATENT DOCUMENTS

| 2010/0141812 | A1* | 6/2010 | Hirota | H04N 9/045 348/279 |
| 2010/0309351 | A1* | 12/2010 | Smith | H04N 5/335 348/280 |
| 2013/0076933 | A1* | 3/2013 | Ahn | H04N 5/228 348/222.1 |

FOREIGN PATENT DOCUMENTS

| CN | 101753863 A | 6/2010 |
| JP | 2006-165975 A | 6/2006 |

(Continued)

OTHER PUBLICATIONS

Office Action for CN Patent Application No. 201480051655.X, dated Feb. 14, 2017, 05 pages of Office Action and 06 pages of English Translation.

(Continued)

Primary Examiner — Justin P Misleh
(74) Attorney, Agent, or Firm — Chip Law Group

(57) ABSTRACT

The present technology relates to a solid state imaging device, an imaging device, and an electronic device capable of improving color resolution and luminance resolution, and reducing a false color. White W as a luminance main component is arranged in a checkered pattern. A unit of two green G pixels are arranged in each of rows and columns in a range of 8 pixels×8 pixels to increase uniformity of green G and thereby improve resolution of green G. Moreover, rows and columns containing blue B are separated from rows and columns containing red R to improve resolution. Furthermore, white W, blue B, and red R are arranged to surround isolated point pixels corresponding to lost pixels of white W, blue B, and red R for easy interpolation.

14 Claims, 25 Drawing Sheets

(56) References Cited

FOREIGN PATENT DOCUMENTS

JP    2010-136225 A    6/2010
JP    2012-257193 A    12/2012

OTHER PUBLICATIONS

International Search Report and Written Opinion of PCT Application No. PCT/JP2014/074243, dated Nov. 11, 2014, 08 pages of English Translation and 07 pages of ISRWO.
International Preliminary Report on Patentability of PCT Application No. PCT/JP2014/074243, dated Mar. 29, 2016, 08 pages of English Translation and 04 pages of IPRP.

* cited by examiner

FIG. 3

| CODING | |
|---|---|
| SQUARE | |
| Bayer | G:B:R = 8:4:4 |
| W CHECKERED | W:G:B:R = 8:4:2:2 |
| W CHECKERED G SLANT STRIPE | W:G:B:R = 8:4:2:2 |

FIG. 4
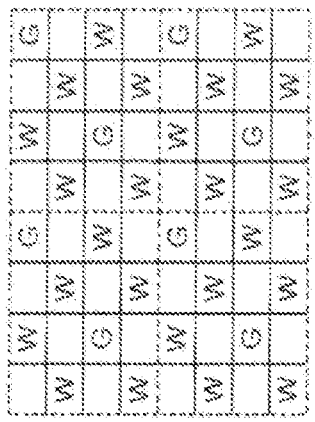
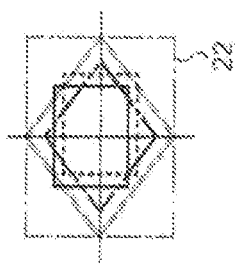
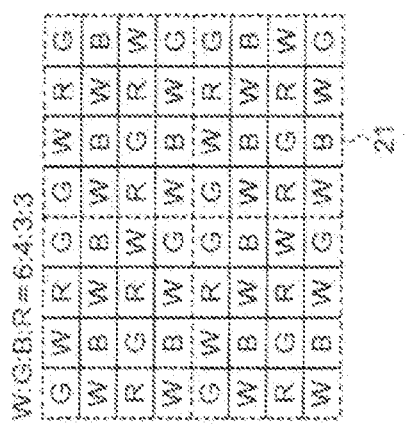
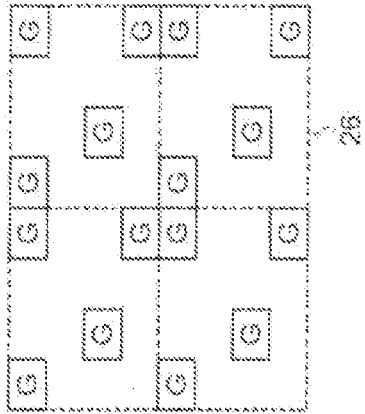
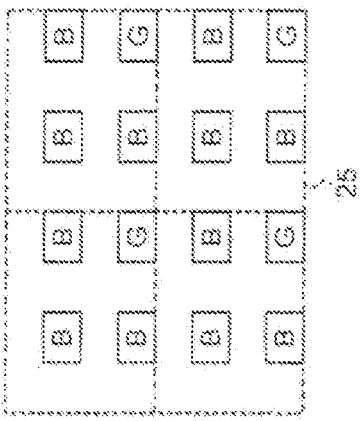
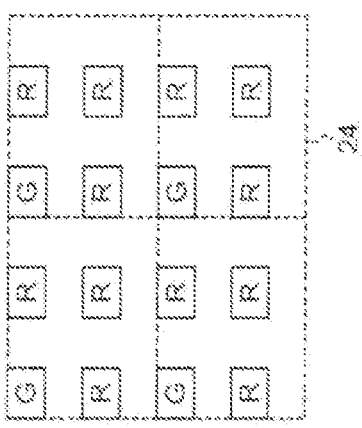

FIG. 13
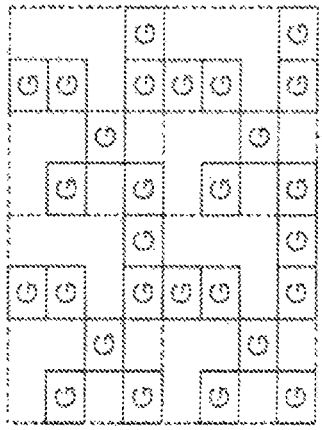
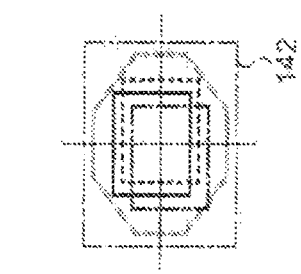

FIG. 20
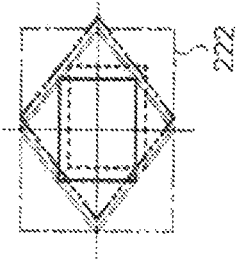
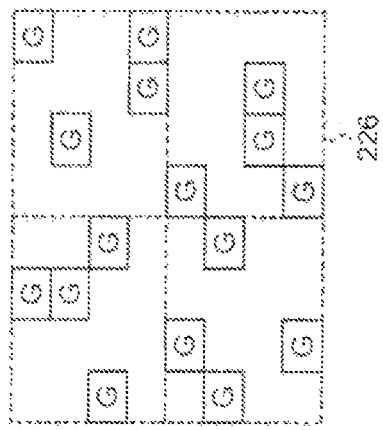
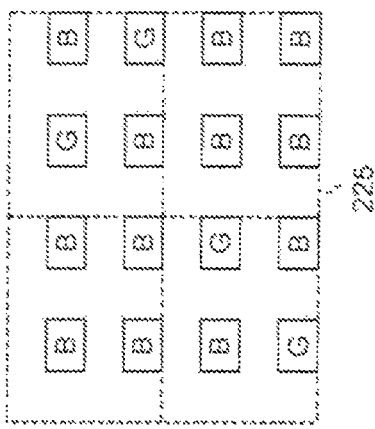
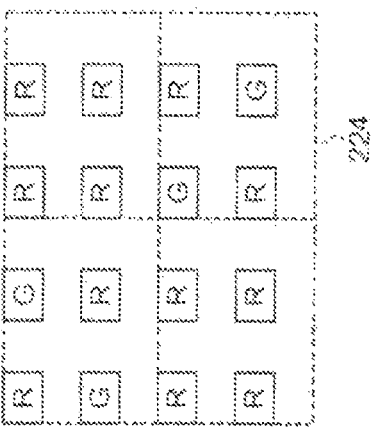

*FIG. 25*

|  | 1 | 2 | 1 | 2 | 1 | 2 | 1 | 2 |
|---|---|---|---|---|---|---|---|---|
| g1/R1/w2 | G | W | R | W | G | W | R | W |
| WG1/B2/b2 | W | B | G | B | W | B | G | B |
| r1/R1/wg2 | R | G | R | W | R | G | R | W |
| W1/b2/G2 | W | B | W | G | W | B | W | G |
| g1/R1/w2 | G | W | R | W | G | W | R | W |
| WG1/B2/b2 | W | B | G | B | W | B | G | B |
| r1/R1/wg2 | R | G | R | W | R | G | R | W |
| W1/b2/G2 | W | B | W | G | W | B | W | G |

~311

SOLID STATE IMAGING DEVICE, IMAGING DEVICE, AND ELECTRONIC DEVICE FOR CONTROL OF COLOR AND LUMINANCE RESOLUTIONS

TECHNICAL FIELD

The present technology relates to a solid state imaging device, an imaging device, and an electronic device, and more particularly to a solid state imaging device, an imaging device, and an electronic device capable of realizing high sensitivity, high luminance resolution, and high color resolution.

BACKGROUND ART

There have been proposed a number of technologies of a color filter array and signal processing for color coding which uses a color corresponding to a main component of a luminance signal, such as white (W: White), to increase sensitivity of a solid state imaging device. The color coding using white includes white checkered (W-checkered) color coding containing white arranged in a checkered pattern, and white checkered G slant stripes, for example (see Patent Document 1, for example).

In general, the W checkered pattern widely used, and a color array often adopted for array color coding defining four-color 4 pixels×4 pixels in an array as disclosed in Patent Document 1 establishes a pixel ratio of white W, green G, red R, and blue B as W:G:B:R=8:4:2:2.

CITATION LIST

Patent Document

Patent Document 1: Japanese Patent No. 4683121

SUMMARY OF THE INVENTION

Problems to be Solved by the Invention

However, the array of W:G:B:R=8:4:2:2 determined for the W checkered pattern and disclosed in Patent Document 1 may lower color resolution and cause a false color for an ordinary Bayer array (RGB-Bayer) of G:B:R=8:4:4.

Particularly, each number of red R pixels and blue B pixels is one fourth of the number of white W pixels corresponding to luminance pixels, in which condition reduction of a false color may be difficult even when a suppression filter having a Nyquist frequency of fs/2 (fs: sampling frequency) is used. In this case, improvement of resolution and reduction of a false color may be difficult to achieve.

The present technology has been developed in consideration of these circumstances. The present technology particularly realizes high sensitivity, high luminance resolution, and high color resolution, and further reduces generation of a false color by increasing luminance pixels while securing appropriate balance between the numbers of pixels of respective colors.

Solutions to Problems

A solid state imaging device according to an aspect of the present technology includes: luminance pixels that detect light containing luminance as a main component; first pixels that detect light having a first wavelength; second pixels that detect light having a second wavelength; and third pixels that detect light having a third wavelength. The first pixels and the second pixels are so arranged as to uniformly surround lost positions of the first pixels and the second pixels, respectively.

The respective lost positions of the first pixels and the second pixels may be arranged at equal intervals in both of a horizontal direction and a vertical direction, or in either the horizontal or the vertical direction.

The luminance pixels may be so arranged as to uniformly surround lost positions of the luminance pixels.

The third pixels may be randomly arranged.

The luminance pixels, the first pixels, the second pixels, and the third pixels may be arranged such that a pixel number ratio of the luminance pixels, the first pixels, the second pixels, and the third pixels becomes 6:4:3:3.

The third pixels may be arranged such that the same number of the third pixels is provided in each of rows and columns.

The luminance pixels, the first pixels, the second pixels, and the third pixels may be arranged such that a pixel number ratio of the luminance pixels, the first pixels, the second pixels, and the third pixels becomes 7:3:3:3.

Pixel values of the luminance pixels positioned adjacent to each other in an oblique direction may be added in analog and transferred. Pixel values of the third pixels positioned adjacent to each other in an oblique direction may be added in analog and transferred. Pixel values of the first pixels positioned adjacent to each other in the vertical direction may be added in analog and transferred. Pixel values of the second pixels positioned adjacent to each other in the vertical direction may be added in analog and transferred.

The pixel values of the luminance pixel, the first pixels, the second pixels, and the third pixels may be calculated based on mutual correlations at the centers of gravity of the respective pixels.

A plurality of different exposure times may be set for pixels included in the luminance pixels, in the first pixels, in the second pixels, and in the third pixels.

A first exposure time and a second exposure time may be set for pixels included in the luminance pixels, in the first pixels, in the second pixels, and in the third pixels.

An imaging device according to an aspect of the present technology includes: luminance pixels that detect light containing luminance of a solid state imaging device as a main component; first pixels that detect light having a first wavelength; second pixels that detect light having a second wavelength; and third pixels that detect light having a third wavelength. The first pixels and the second pixels are so arranged as to uniformly surround lost positions of the first pixels and the second pixels, respectively.

An electronic device according to an aspect of the present technology includes: luminance pixels that detect light containing luminance as a main component; first pixels that detect light having a first wavelength; second pixels that detect light having a second wavelength; and third pixels that detect light having a third wavelength. The first pixels and the second pixels are so arranged as to uniformly surround lost positions of the first pixels and the second pixels, respectively.

An aspect of the present technology includes luminance pixels that detect light containing luminance as a main component, first pixels that detect light having a first wavelength, second pixels that detects light having a second wavelength, and third pixels that detect light having a third wavelength. The first pixels and the second pixels are so arranged as to uniformly surround lost positions of the first pixels and the second pixels, respectively.

Effects of the Invention

According to an aspect of the present technology, high sensitivity, high luminance resolution, and high color resolution can be realized and further generation of a false color can be reduced by increasing the number of luminance pixels while securing appropriate balance between the numbers of respective color pixels.

BRIEF DESCRIPTION OF DRAWINGS

FIG. 3 is a view illustrating an example of conventional color coding.

FIG. 4 is a view illustrating an example of color coding according to a configuration example of a first embodiment to which the present technology has been applied.

FIG. 13 is a view illustrating an example of color coding according to a fifth modified example.

FIG. 20 is a view illustrating an example of color coding according to a configuration example of a ninth embodiment to which the present technology has been applied.

FIG. 25 is a view illustrating an example of color coding according to a configuration example of a twelfth embodiment to which the present technology has been applied.

MODE FOR CARRYING OUT THE INVENTION

Modes for carrying out the invention (hereinafter referred to as embodiments) are hereinafter described. The embodiments are described in the following order.

1. Configuration Example of Solid State Imaging Device
2. Configuration Example of Unit Pixel
3. First Example (an example of W:G:B:R=6:4:3:3)
4. First Modified Example (an example of first embodiment allowing imaging in dark place)
5. Second Embodiment (an example of W:G:B:R=7:3:3:3)
6. Second Modified Example (an example of second embodiment allowing imaging in dark place)
7. Third Embodiment (an example increasing dispersiveness of green G at W:G:B:R=7:3:3:3)
8. Third Modified Example (an example of third embodiment allowing imaging in dark place)
9. Fourth Embodiment (an example further increasing dispersiveness of green G at W:G:B:R=7:3:3:3)
10. Fourth Modified Example (an example of fourth embodiment allowing imaging in dark place)
11. Fifth Embodiment (an example further increasing dispersiveness of green G at W:G:B:R=7:3:3:3)
12. Fifth Modified Example (an example of fifth embodiment allowing imaging in dark place)
13. Sixth Embodiment (an example further increasing dispersiveness of green G at W:G:B:R=6:4:3:3)
14. Sixth Modified Example (an example of sixth embodiment allowing imaging in dark place)
15. Seventh Embodiment (an example further increasing dispersiveness of green G at W:G:B:R=6:4:3:3)
16. Seventh Modified Example (an example of seventh embodiment allowing imaging in dark place)
17. Eighth Embodiment (an example further increasing dispersiveness of green G at W:G:B:R=6:4:3:3)
18. Eighth Modified Example (an example of eighth embodiment allowing imaging in dark place)
19. Ninth Embodiment (an example further increasing dispersiveness of green G at W:G:B:R=6:4:3:3)
20. Ninth Modified Example (an example of ninth embodiment allowing imaging in dark place)
21. Tenth Embodiment (an example determining white W as main component for luminance at W:G:B:R=6:4:3:3)
22. Tenth Modified Example (an example of tenth embodiment allowing imaging in dark place)
23. Eleventh Embodiment (an example of pixel addition at W:G:B:R=6:4:3:3)
24. Twelfth Embodiment (an application example of SVE control)

1. Configuration Example of Solid State Imaging Device

Figure 1:
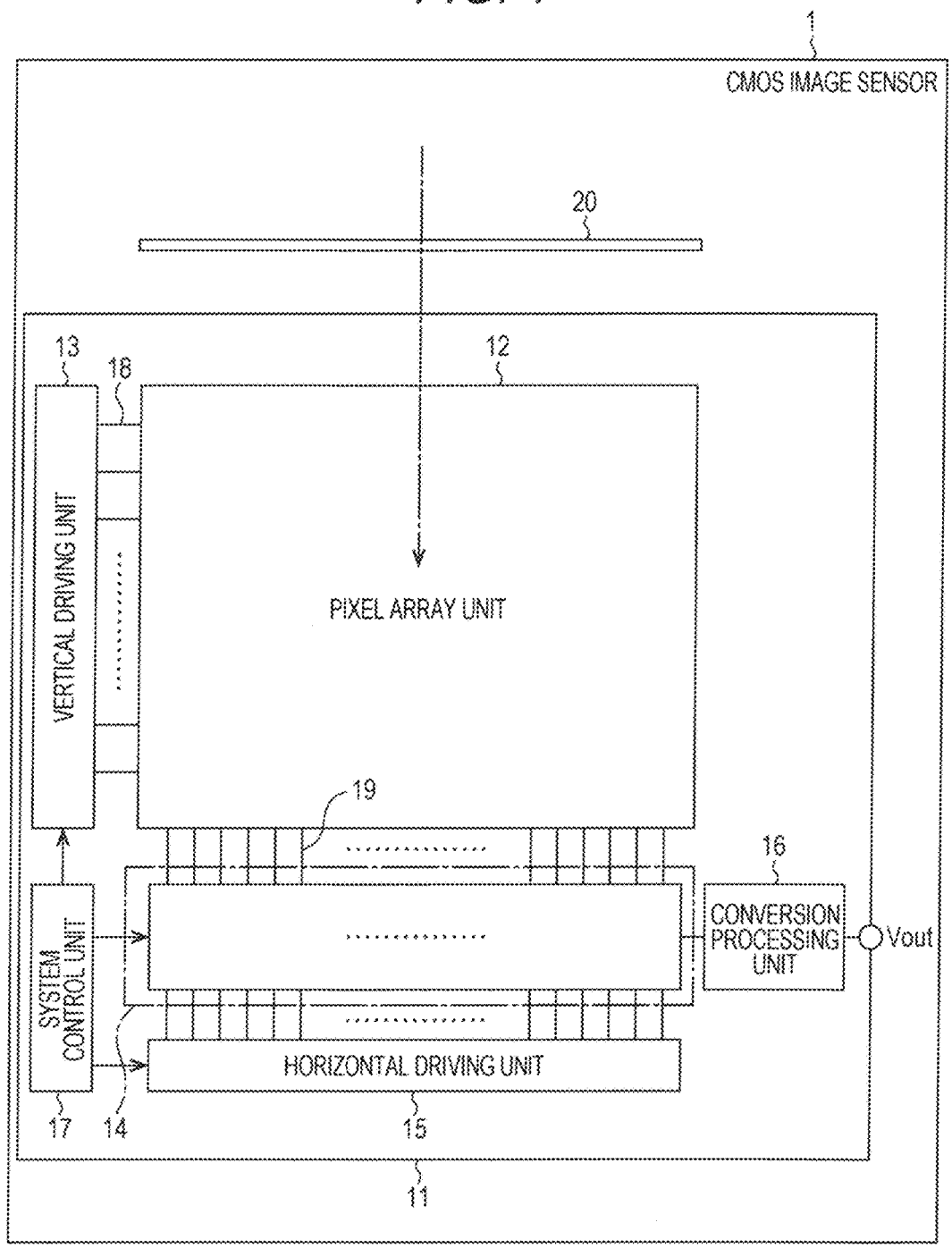
FIG. 1 is a view illustrating a configuration example of a solid state imaging device to which the present technology has been applied.

FIG. 1 illustrates a configuration example of a solid state imaging device according to the present technology, such as a CMOS (Complementary Metal Oxide Semiconductor) image sensor as a type of X-Y address solid state imaging device.

A CMOS image sensor 1 illustrated in FIG. 1 includes a pixel array unit 12 formed on a semiconductor substrate (hereinafter abbreviated as "sensor chip" when appropriate) 11, and a peripheral circuit unit integrated on the semiconductor substrate 11 where the pixel array unit 12 is mounted. The peripheral circuit unit includes a vertical driving unit 13, a column processing unit 14, a horizontal driving unit 15, a conversion processing unit 16, and a system control unit 17, for example.

The pixel array unit 12 includes two-dimensional arrangement of not-shown unit pixels (hereinafter abbreviated as "pixels" when appropriate) disposed in matrix. Each of the unit pixels contains a photoelectric conversion element which performs photoelectric conversion from incident light constituted by visible light indicated by a long dashed short dashed line into a charge quantity corresponding to a light amount of the light. A specific circuit structure of each unit pixel is detailed below. A color filter array 20 is provided on a light receiving surface (light entering surface) of the pixel array unit 12. One of features of the present technology relates to color coding of the color filter array 20. The details of this feature are described below.

The pixel array unit 12 further includes pixel driving lines 18 each wired in the left-right direction (pixel array direction of pixel row, or horizontal direction) in the figure for a corresponding row of the pixel array in matrix, and a vertical signal lines 19 each formed in the up-down direction (pixel array direction of pixel column, or vertical direction) in the figure for a corresponding column. FIG. 1 shows one line for each pixel driving line. However, each pixel driving line is not limited to one line. One end of each pixel driving line is connected to an output end of a corresponding row of the vertical driving unit 13.

The vertical driving unit 13 is constituted by a shift register, an address decoder and the like. The vertical driving unit 13 includes a reading scanning system and a sweep-out scanning system not specifically depicted in the figure. The reading scanning system sequentially performs selective scanning for each row of the unit pixels from which signals are read.

On the other hand, the sweep-out scanning system sweeps out (resets) useless charge from the photoelectric conversion elements of the unit pixels included in the reading rows for which reading scanning is performed by the reading scanning system. The sweep-out scanning system executes this sweep-out scanning prior to the reading scanning by a period of shutter speed. This sweep out (reset) of useless charge by the sweep-out scanning system achieves so-called electronic shutter operation. The electronic shutter operation in this context refers to an operation for sweeping out photocharge of photoelectric conversion elements and starting new exposure (starting accumulation of photocharge).

A signal read by the reading operation performed by the reading scanning system corresponds to a light amount having entered after the preceding reading operation or the electronic shutter operation. In this case, the period from the reading timing of the preceding reading operation or the sweep-out timing of the electronic shutter operation to the reading timing of the current reading operation corresponds to an accumulation time (exposure time) of photocharge of the unit pixel.

Signals output from the unit pixels of the pixel rows subjected to selective scanning by the vertical driving unit 13 are supplied to the column processing unit 14 via the corresponding vertical signal lines 19. The column processing unit 14 performs predetermined signal processing for analog pixel signals output from respective pixels of the selected rows for each of the pixel columns of the pixel array unit 12.

Signal processing performed by the column processing unit 14 includes CDS (Correlated Double Sampling) processing, for example. The CDS processing extracts a reset level and a signal level output from each pixel of the selected row, and calculates a level difference between these levels to obtain a signal of the pixel for one row. The CDS processing also removes fixed pattern noise of pixels. The column processing unit 14 may have an A/D conversion function for digitizing analog pixel signals.

The horizontal driving unit 15 includes a shift register, an address decoder and the like, and sequentially performs selective scanning for circuit parts corresponding to pixel rows of the column processing unit 14. The pixel signals subjected to signal processing by the column processing unit 14 for each pixel column are sequentially output by the selective scanning of the horizontal driving unit 15.

The conversion processing unit 16 performs arithmetic processing to convert the foregoing signals output from the respective pixels of the pixel array unit 12 and corresponding to the color array of the color filter array (color filter unit) 20.

The system control unit 17 receives a clock given from the outside of the sensor chip 11, and data or the like for instructing an operation mode, and outputs data such as internal information about the CMOS image sensor 1. The system control unit 17 further includes a timing generator for generating various types of timing signals, and controls driving of the vertical driving unit 13, the column processing unit 14, the horizontal driving unit 15, the conversion processing unit 16 and others based on the various types of timing signals generated by the timing generator.

2. Configuration Example of Unit Pixel

Figure 2:
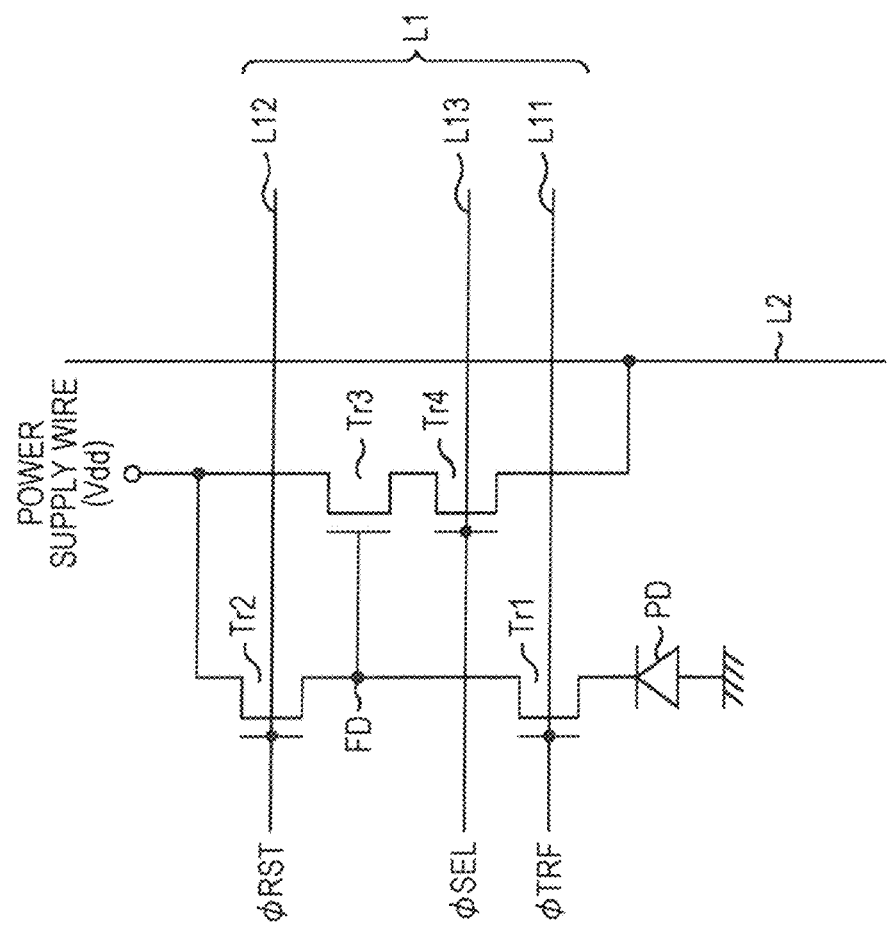
FIG. 2 is a view illustrating a configuration example of a unit pixel.

A circuit structure example of the pixel unit is hereinafter described with reference to FIG. 2. FIG. 2 is a circuit diagram illustrating an example of the circuit structure of the unit pixel. As illustrated in FIG. 2, the unit pixel according to this circuit example includes a photoelectric conversion element such as a photodiode PD, and four transistors such as a transfer transistor Tr1, a reset transistor Tr2, an amplification transistor Tr3, and a selection transistor Tr4.

According to this example, each of the four transistors Tr1 through Tr4 is constituted by an N-channel MOS transistor. The conductive type combination of the transfer transistor Tr1, the reset transistor Tr2, the amplification transistor Tr3, and the selection transistor Tr4 is presented only by way of example. Other combinations may be adopted when appropriate.

According to the unit pixel illustrated in FIG. 2, three driving wires of a transfer line L11, a reset line L12, and a selection line L13 are provided as a common pixel driving line L1 for respective pixels of an identical pixel row, for example. Each one end of the transfer line L11, the reset line L12, and the selection line L13 is connected to an output end of a corresponding pixel row of the vertical driving unit 13 in units of a pixel row.

An anode electrode of the photodiode PD is connected to a negative side power supply (such as ground) to photoelectrically convert received light into photocharge (photoelectron in this example) having a charge quantity corresponding to the amount of the light. A cathode electrode of the photodiode PD is electrically connected to a gate electrode of the amplification transistor Tr3 via the transfer transistor Tr1. A node electrically connected to the gate electrode of the amplification transistor Tr3 is referred to as a floating diffusion FD.

The transfer transistor Tr1 is connected between the cathode electrode of the photodiode PD and the floating diffusion FD. A high level (such as Vdd level) active (hereinafter referred to as "high active") transfer pulse φTRF is given to a gate electrode of the transfer transistor Tr1 via the transfer line L11. The transfer transistor Tr1 having received the transfer pulse φTRF comes into on-state, and transfers the photocharge obtained by photoelectric conversion by the photodiode PD to the floating diffusion FD.

A drain electrode of the reset transistor Tr2 is connected to a pixel power supply Vdd, while a source electrode of the reset transistor Tr2 is connected to the floating diffusion FD. A high active reset pulse φRST is given to a gate electrode of the reset transistor Tr2 via the reset line L12 prior to transfer of signal charge from the photodiode PD to the floating diffusion FD. The reset transistor Tr2 having received the reset pulse φRST comes into on-state, and sweeps out the charge of the floating diffusion FD to the pixel power supply Vdd to reset the floating diffusion FD.

The gate electrode of the amplification transistor Tr3 is connected to the floating diffusion FD, while a drain electrode of the amplification transistor Tr3 is connected to the pixel power supply Vdd. The amplification transistor Tr3 outputs a potential of the floating diffusion FD after reset by the reset transistor Tr2 as a reset signal (reset level) Vreset. The amplification transistor Tr3 further outputs a potential of the floating diffusion FD after transfer of the signal charge by the transfer transistor Tr1 as a light accumulation signal (signal level) Vsig.

A drain electrode of the selection transistor Tr4 is connected to a source electrode of the amplification transistor Tr3, while a source electrode of the selection transistor Tr4 is connected to the vertical signal line L2, for example. A high active selection pulse φSEL is given to a gate electrode of the selection transistor Tr4 via the selection line L13. The selection transistor Tr4 having received the selection pulse φSEL comes into on-state, and brings the unit pixel into selection state to relay a signal output from the amplification transistor Tr3 to a vertical signal line 19.

In an alternative circuit structure, the selection transistor Tr4 may be connected between the pixel power supply Vdd and the drain of the amplification transistor Tr3.

The pixel structure of the unit pixel is not limited to the structure constituted by the four transistors as discussed above. For example, the unit pixel may have a pixel structure constituted by three transistors including a transistor functioning both as the amplification transistor Tr3 and the selection transistor Tr4. The pixel circuit structure of the unit pixel may be arbitrarily determined.

3. Example of Conventional Color Coding

FIG. 3 illustrates an example of conventional color coding adopted for the color filter array 20. More specifically, FIG. 3 shows pixel arrays of 4 pixels×4 pixels in color coding examples of Bayer array, W checkered (white checkered) array, and W checkered G (green) slant stripe array in this order from above. Spatial frequency distributions in respective colors are shown in the right part of FIG. 3. In the figure, each square indicates a pixel, while W, R, G, and B put in the respective squares indicate white, red, green, and blue, respectively. As a general rule, the respective colors are hereinafter referred to as white W, red R, green G, and blue B.

More specifically, the Bayer array shown in the left upper part in FIG. 3 contains green G arranged in a checkered pattern in respective pixels including pixels located at the left upper end and the right lower end. The Bayer array in FIG. 3 further contains red R arranged in respective pixels including the right upper end pixel in a manner that one green G pixel is sandwiched between red R pixels in the horizontal direction and the vertical direction. The Bayer array in FIG. 3 further contains blue B arranged in respective pixels including the left lower end pixel in a manner that one green G pixel is sandwiched between blue B pixels in the horizontal direction and the vertical direction.

The W checkered array shown in the left middle part in FIG. 3 contains white W arranged in a checkered pattern in respective pixels including pixels located at the left upper end and the right lower end. The W checkered array in FIG. 3 further contains green G arranged in respective pixels including the right upper end pixel in a manner that one white W pixel is sandwiched between red R pixels in the horizontal direction and the vertical direction. The W checkered array in FIG. 3 further contains blue B arranged in a pixel at the left lower end and a pixel in the second row from above and in the second column from the right, and contains red R in a pixel in the leftmost column and in the second row from above, and in a pixel in the second column from the right and in the lowermost row.

The W checkered G slant stripe array shown in the left lower part in FIG. 3 contains white W arranged in a checkered pattern in respective pixels including pixels located at the left upper end and the right lower end. The W checkered G slant stripe array in FIG. 3 contains red R, blue B, red R, and blue B alternately arranged in this order from above in a direction obliquely downward toward the left from a pixel at the right upper end. The W checkered G slant stripe array further contains green G in a pixel in the second column from the left and in the uppermost row, in a pixel in the rightmost column and in the second row from below, and in pixels adjacent to these pixels obliquely downward toward the left.

According to the Bayer array illustrated in FIG. 3, green G is arranged in a checkered pattern. In this case, green G indicated by a long dashed double-short dashed line in the spatial frequency distribution has distribution of Nyquist frequency indicated by a long dashed short dashed line in the horizontal direction and the vertical direction, but has the half distribution in the oblique directions at 45°, as illustrated in the right upper part in FIG. 3.

In case of the Bayer array illustrated in FIG. 3, however, as illustrated in the right upper part in FIG. 3, each of red R indicated by a solid line and blue B indicated by a dotted line has the half distribution of Nyquist frequency in each of the horizontal direction, vertical direction, and the oblique directions at 45°.

Accordingly, in the Bayer array, green G is present in every row and column in the horizontal direction and the vertical direction, but present only in every other row in the directions at 45°. Accordingly, green G has distribution equivalent to Nyquist frequency in the horizontal direction and the vertical direction, but has only the half distribution of Nyquist frequency in the directions at 45°.

On the other hand, each of red R and blue B is present in every other row in the horizontal direction, the vertical direction, and the directions at 45°. Accordingly, each of red R and blue B has the half distribution of Nyquist frequency in the horizontal direction, the vertical direction, and the directions at 45°. The solid line and the dotted line indicating the frequency distributions of red R and blue B, respectively, shown in the spatial frequency distributions in the right upper part in FIG. 3 are depicted as lines shifted from each other only for convenience of explanation. These distributions are located at the same position in actual situations.

In case of the spatial frequency distribution of the W checkered array, white W indicated by a hatched dotted line in gray has distribution identical to Nyquist frequency in the horizontal direction and the vertical direction, but has the half distribution of Nyquist frequency in the oblique directions at 45° as illustrated in the right middle part in FIG. 3, similarly to green G in the Bayer array discussed above.

However, in case of W checkered array in FIG. 3, green G indicated by a long dashed double-short dashed line is present in every other row in the horizontal direction, vertical direction, and the oblique directions at 45° as illustrated in the right middle part in FIG. 3, similarly to red R or blue B in the Bayer array. Accordingly, green G has the half distribution of Nyquist frequency in all of these directions. On the other hand, each of red R indicated by a solid line and blue B indicated by a dotted line is present in every other row in the horizontal direction and the vertical direction, and thus has the half distribution of Nyquist frequency in the horizontal direction and the vertical direction. However, each of red R and blue B is present in every four rows in the oblique directions at 45°, and thus has one fourth distribution of Nyquist frequency in the oblique directions at 45°. In case of W checkered array, white W indicated by the hatched dotted line in gray is present in every row and column in the horizontal direction and the vertical direction, and thus has distribution identical to Nyquist frequency in the horizontal direction and the vertical direction. However, white W is present only in every other row in the oblique directions at 45°, and thus has the half distribution of Nyquist frequency in the oblique directions at 45°.

In case of the spatial frequency distribution of W checkered G slant stripe array, white W indicated by a hatched dotted line in gray has distribution equivalent to Nyquist frequency in the horizontal direction and the vertical direction as illustrated in the right lower part in FIG. 3, similarly to green G in the Bayer array discussed above. However, white W has the half of this distribution in the oblique directions at 45°.

In case of the W checkered G slant stripe array illustrated in FIG. 3, green G indicated by a long dashed double-short dashed line is present in every row and column in the horizontal direction and the vertical direction. Accordingly, green G has distribution equivalent to Nyquist frequency in the horizontal direction and the vertical direction, as illustrated in the right lower part in FIG. 3. However, green G is present in every other row in the oblique direction at 45° upward toward the left, and thus has the half distribution of Nyquist frequency in the oblique direction at 45° upward toward the left. On the other hand, green G is present in every four rows in the oblique direction at 45° upward toward the right, and thus has one fourth distribution of Nyquist frequency with a partially recessed shape in the oblique direction at 45° upward toward the right.

Each of red R indicated by a solid line and blue B indicated by a dotted line is present in every other row in the horizontal direction and the vertical direction, and thus has the half distribution of Nyquist frequency in the horizontal direction and the vertical direction. However, each of red R and blue B is present in every four rows in every oblique direction at 45°, and thus has one fourth distribution of Nyquist frequency in every oblique direction at 45°.

As apparent from these findings, the Bayer array is highly effective in increasing resolution and reducing distortion, but easily lowers sensitivity. On the other hand, W checkered array and W checkered array G slant stripe array containing white W in a checkered pattern are capable of increasing resolution and raising sensitivity to approximately double. Moreover, W checkered array G slant stripe array has a structure easily converted into pixel values for analog addition and for the Bayer array.

According to the W checkered array or W checkered G slant stripe array, however, the pixel number ratio is established as W:G:B:R=8:4:2:2, in which condition particularly the spatial frequency distributions of blue B and red R decrease. In this case, color resolution easily lowers. Moreover, the W checkered array G slant stripe array easily produces a false color in an oblique direction.

3. First Embodiment

FIG. 4 illustrates a configuration example of a pixel array of color coding according to a first embodiment, as color coding capable of increasing color resolution and reducing a false color while maintaining high resolution and high sensitivity offered as advantages of the Bayer array, W checkered array, and W checkered G slant stripe array.

FIG. 4 illustrates 8 pixels×8 pixels array example 21, a spatial frequency distribution 22, and arrangement examples 23 through 26 explaining color coding according to the configuration example of the first embodiment. According to the color coding illustrated in FIG. 4, the pixel number ratio is established as W:G:R:B=6:4:3:3 (quadrupled number of pixels are shown in the figure). More specifically, according to the color coding illustrated in FIG. 4, a 4 pixels×4 pixels area, which is one of four divisions of 8 pixels×8 pixels divided in the up-down and left-right directions, is repeatedly arranged as indicated by dotted frames in the array example 21. In one of the divided areas, green G is arranged in pixels at all corners except for the left lower end, and in a pixel in the second column from the left and in the second row from below. Red R is arranged in pixels in the second column from the right and in the uppermost row and in the third row from above, and in a pixel in the leftmost column and in the second row from below. Blue B is arranged in pixels in the second column from the left and in the lowermost row and in the third row from below, and in a pixel in the rightmost column and in the second row from above. White W is arranged in all pixels other than the pixels noted above.

In this case, white W indicated by a hatched dotted line is present in every row and column in the horizontal direction and the vertical direction as indicated by the spatial frequency distribution 22. Accordingly, white W has distribution equivalent to Nyquist frequency in the horizontal direction and the vertical direction. However, white W is present in every other row in the oblique directions at 45°, and thus has the half distribution of Nyquist frequency in the oblique directions at 45°. Each of red R and blue B is present in every other row in all of the horizontal direction, vertical direction, and oblique direction at 45°, and thus has the half distribution of Nyquist frequency in all of the horizontal direction, vertical direction, and oblique direction at 45°, as indicated in the arrangement examples 24 and 25. On the other hand, a row where green G is absent in row and column is produced in every four rows in the horizontal direction and the vertical direction as illustrated in the arrangement example 26. Accordingly, green G has three fourths distribution of Nyquist frequency in the horizontal direction and the vertical direction.

According to this color coding, white W is arranged in such a manner as to surround green G arranged at a lost position (or isolated point position) of white W at the time of formation of white W in a checkered pattern as a luminance main component, as illustrated in the arrangement example 23 in FIG. 4. Accordingly, pixel information about white W is easily interpolated for the pixel at the position of green G corresponding to the lost position of white W by utilizing pixel information about white W arranged around the lost position at the time of demosaic.

More specifically, green G requiring formation of white W corresponds to an isolated point produced when white W corresponding to a luminance main component is formed in a checkered pattern as illustrated in the arrangement example 23. For the pixel to which green G is given as the isolated point at the time of formation of checkered white W, white W pixels are arranged at substantially uniform positions in every other pixel in the horizontal direction and vertical direction. Moreover, the pixel to which green G is given is arranged adjacent to white W pixels located at four positions in the oblique directions. This arrangement allows easy and appropriate interpolation of information about the white W pixel for the pixel to which green G is given as the isolated point at the time of formation of checkered white W, by utilizing information about white W around the pixel to which green G is given.

According to the color coding illustrated in FIG. 4, the arrangement example 23 shows an arrangement example extracting only pixels to be formed as white W. Accordingly, white W is interpolated and formed later in the positions of green G contained in the arrangement example 23. Similarly, the arrangement examples 24 through 26 of the color coding illustrated in FIG. 4 show arrangement examples extracting only pixels to be formed as red R, blue B, and green G, respectively.

As illustrated in the arrangement example 24 in FIG. 4, red R is arranged at substantially uniform positions for surrounding green G corresponding to the isolated point and requiring formation of red R. Accordingly, pixel information about red R is easily and appropriately interpolated for the position of green G corresponding to the isolated point position of red R by utilizing information about red R pixels present around the green G pixel as the isolated point position of red R at the time of demosaic.

More specifically, green G requiring formation of red R corresponds to an isolated point produced when red R is formed as illustrated in the arrangement example 24. In this case, red R pixels are disposed at substantially uniform positions in every other pixel in the horizontal direction, vertical direction, and the oblique direction at 45°. According to this arrangement, pixel information about red R is easily and appropriately interpolated for green G corresponding to the isolated point at the time of formation of red R by utilizing information about red R pixels arranged at substantially uniform positions.

As illustrated in the arrangement example 25 in FIG. 4, blue B is arranged at substantially uniform positions for surrounding green G corresponding to the isolated point of blue B and requiring formation of blue B. Accordingly, pixel information about blue B is easily and appropriately interpolated for the position of green G by utilizing information about these blue B pixels at the time of demosaic.

More specifically, green G requiring formation of blue B corresponds to an isolated point produced when blue B is formed as illustrated in the arrangement example 25. In this case, blue B pixels are arranged at substantially uniform positions in every other pixel in the horizontal direction, vertical direction, and the oblique direction at 45°. According to this arrangement, pixel information about blue B is easily and appropriately interpolated for green G corresponding to the isolated point at the time of formation of blue B by utilizing information about blue B pixels arranged at substantially uniform positions.

According to the W checkered array and W checkered G slant stripe array described with reference to FIG. 3, the ratio of the respective colors is established as W:G:B:R=8:4:2:2. However, according to the arrangement example of color coding illustrated in FIG. 4, the ratio of the respective colors is established as W:G:B:R=6:4:3:3.

More specifically, the arrangement example establishes W:G:B:R=6:4:3:3 by giving one white W pixel in the W checkered array and W checkered G slant stripe array in FIG. 3 to each of red R and blue B, separating rows and columns containing red R from rows and columns containing blue B, determining a pixel located at a position easily interpolated for each of white W, red R, and blue B in the pixel arrangement, and giving green G to the determined pixel.

According to this arrangement, blue B and red R are contained in different rows and columns. In this case, pixel signals at the isolated points of blue B and red R are more easily and more appropriately interpolated at the time of demosaic. Accordingly, color resolution improves. Moreover, white W formed in a checkered pattern by interpolation improves luminance resolution and sensitivity.

As a result, improvement of sensitivity, luminance resolution, and color resolution is achievable.

4. First Modified Example

According to the example described above, white W is determined as a luminance main component. Alternatively, green G may be determined as a luminance main component. In this case, infrared light IR may be used as a color component in place of green G.

Figure 5:
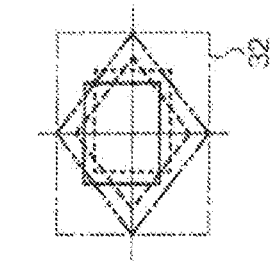
FIG. 5 is a view illustrating an example of color coding according to a first modified example.

FIG. 5 illustrates an example of color coding which uses the example of the color coding illustrated in FIG. 4 while determining green G as a luminance main component, and infrared light IR as a color component in place of green G.

Accordingly, the color coding illustrated in FIG. 5 uses green G in place of white W in FIG. 4, and infrared light IR in place of green G in FIG. 4.

An arrangement example 31, a spatial frequency distribution 32, and arrangement examples 33 through 36 in FIG. 5 correspond to the arrangement example 21, the spatial frequency distribution 22, and the arrangement examples 23 through 26 illustrated in FIG. 4, respectively.

This structure realizes high resolution imaging even in a dark place by utilizing infrared light illumination.

The example of color coding illustrated in FIG. 5 is similar to the example of color coding illustrated in FIG. 4 except for the use of green G in place of white W in FIG. 4 and the use of infrared light IR in place of green G in FIG. 4. Accordingly, the same explanation is not repeated herein.

5. Second Embodiment

According to the example described above, the pixel number ratio of white W, green G, blue B, and red R is established as W:G:B:R=6:4:3:3. However, the pixel number ratio may be established as W:G:B:R=7:3:3:3 by replacement of green G with white W by one pixel to reduce loss of white W corresponding to a luminance main component and improve sensitivity and luminance resolution.

Figure 6:
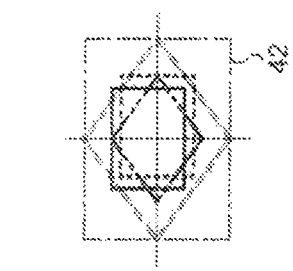
FIG. 6 is a view illustrating an example of color coding according to a configuration example of a second embodiment to which the present technology has been applied.

FIG. 6 illustrates an example of color coding which replaces a part of the pixel arrangement of green G with white W corresponding to the luminance main component to reduce loss of white W corresponding to the luminance main component and improve resolution. The basic color arrangement of the color coding illustrated in FIG. 6 is similar to the example of color coding illustrated in FIG. 4, wherefore only a difference between the example of color coding of this embodiment and the example of color coding illustrated in FIG. 4 is hereinafter described.

The color coding illustrated in FIG. 6 is different from the color coding illustrated in FIG. 4 in that, in an area of 4 pixels×4 pixels corresponding to each of four divisions produced by dividing an arrangement example constituted by 8 pixels×8 pixels into two parts in the horizontal direction and two parts in the vertical direction as illustrated in dotted lines in an arrangement example 41 illustrated in FIG. 6, a pixel positioned at the right upper end is switched from green G illustrated in the arrangement example 11 in FIG. 4 to white W.

This pixel arrangement minimizes loss of white W corresponding to the luminance main component, thereby improving resolution.

Moreover, this pixel arrangement positions three pixels for each of blue B, red R, and green G constituting color resolution in a balanced manner in the 4 pixels×4 pixels area, thereby reducing lowering of color resolution.

The arrangement example 41, a spatial frequency distribution 42, and arrangement examples 43 through 46 in FIG. 6 correspond to the arrangement example 11, the spatial frequency distribution 12, and the arrangement examples 13 through 16 illustrated in FIG. 4, respectively. As illustrated in the spatial frequency distribution 42, one pixel of green G is removed from the example illustrated in FIG. 4, wherefore distribution of green G becomes smaller. However, distributions of other colors are similar to the corresponding distributions illustrated in FIG. 4.

As a result, sensitivity and luminance resolution further improves by reduction of loss of white W corresponding to the luminance main component, in addition to improvement of sensitivity, luminance resolution, and color resolution.

6. Second Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 7:
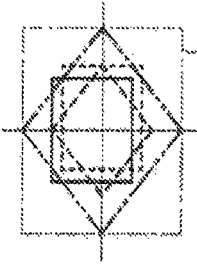
FIG. 7 is a view illustrating an example of color coding according to a second modified example.

FIG. 7 illustrates an example of color coding which uses the color coding illustrated in FIG. 6 while determining green G as a luminance main component in place of white W, and infrared light IR as a color component in place of green G. Accordingly, the color coding illustrated in FIG. 7 positions green G in place of white W corresponding to the luminance main component in FIG. 6, and infrared light IR in place of green G corresponding to the color component in FIG. 6.

An arrangement example 51, a spatial frequency distribution 52, and arrangement examples 53 through 56 in FIG. 7 correspond to the arrangement example 41, the spatial frequency distribution 42, and the arrangement examples 43 through 46 illustrated in FIG. 6, respectively.

Accordingly, the color coding illustrated in FIG. 7 realizes highly sensitive imaging even in a dark place by utilizing infrared light illumination.

7. Third Embodiment

According to the example described above, the pixel number ratio of white W, green G, blue B, and red R is established as W:G:B:R=7:3:3:3. However, dispersiveness (randomness) of green G illustrated in the arrangement example 46 in FIG. 6 may be improved for further reduction of a false color.

Figure 8:
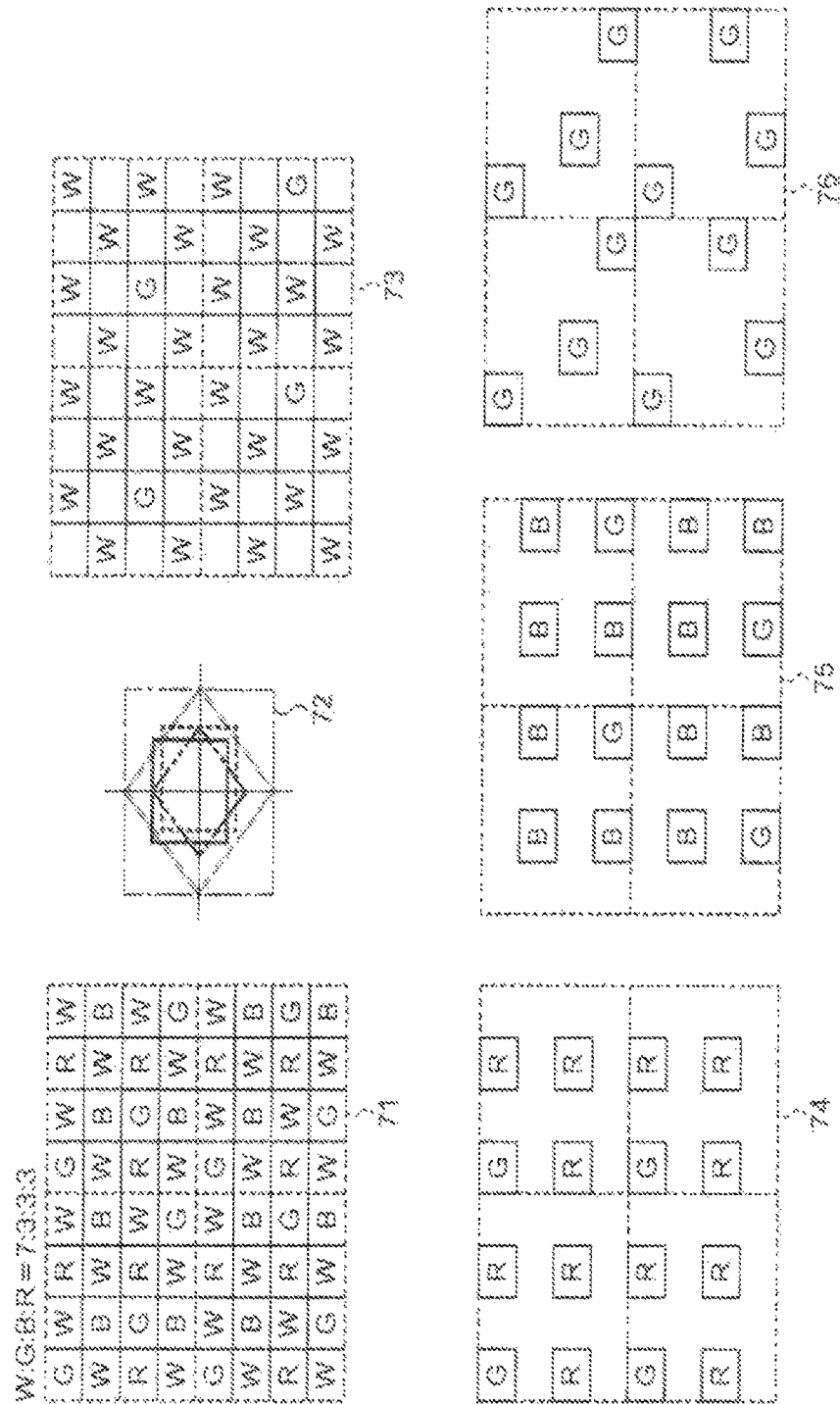
FIG. 8 is a view illustrating an example of color coding according to a configuration example of a third embodiment to which the present technology has been applied.

FIG. 8 illustrates an example of color coding which further disperses positions of green G in the color coding in FIG. 6. An arrangement example 71, a spatial frequency distribution 72, and arrangement examples 73 through 76 in FIG. 8 correspond to the arrangement example 41, the spatial frequency distribution 42, and the arrangement examples 43 through 46 illustrated in FIG. 6, respectively.

The color coding illustrated in FIG. 8 is different from the color coding illustrated in FIG. 6 in that two types of arrangement of green G, which is a color provided as isolated points for white W desired to be formed in a checkered pattern, are established in units of a row where green G is present, and disposed such that the two types are alternately positioned in the color coding.

More specifically, in four divisions of 4 pixels×4 pixels produced by dividing the 8 pixels×8 pixels area into two parts in the horizontal direction and two parts in the vertical direction according to the arrangement example 41 indicated by the dotted line in FIG. 6, green G is positioned as an isolated point in a pixel in the second column from the left and in the second row from below in each of the 4 pixels×4 pixels areas.

According to the color coding illustrated in FIG. 8, however, green G corresponding to the isolated point of white W is located similarly to the arrangement example 41 in each of the two upper side 4 pixels×4 pixels areas of the four divisions. However, green G is positioned in a pixel in the rightmost column and in the second row from below in each of the two lower side 4 pixels×4 pixels areas of the four divisions, as illustrated in the arrangement example 73.

In accordance with this arrangement, in case of the color coding illustrated in FIG. 8, green G corresponding to an isolated point of blue B is located similarly to the arrangement example 45 in each of the two upper side 4 pixels×4 pixels areas of the four divisions. However, green G is positioned in a pixel in the second column from the left and in the lowermost row in each of the two lower side 4 pixels×4 pixels areas of the four divisions as illustrated in the arrangement example 75.

This arrangement changes the arrangement positions of green G provided as the isolated points for white W and blue B desired to be formed, in such a manner that the arrangement of green G in a unit of 4 pixels×4 pixels (a unit of four rows) is alternately changeable by a unit of two columns in the horizontal direction, as illustrated in the arrangement examples 73 and 75. As a result, dispersiveness (randomness) of the positions of pixels of green G improves, wherefore a false color decreases. In principle, the color coding in FIG. 8 thus structured repeats arrangement of the configuration of the 8 pixels×8 pixels unit illustrated in the arrangement example 71 in FIG. 8 in the horizontal direction and the vertical direction.

Accordingly further reduction of a false color is achievable while improving sensitivity, luminance resolution, and color resolution.

8. Third Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 9:
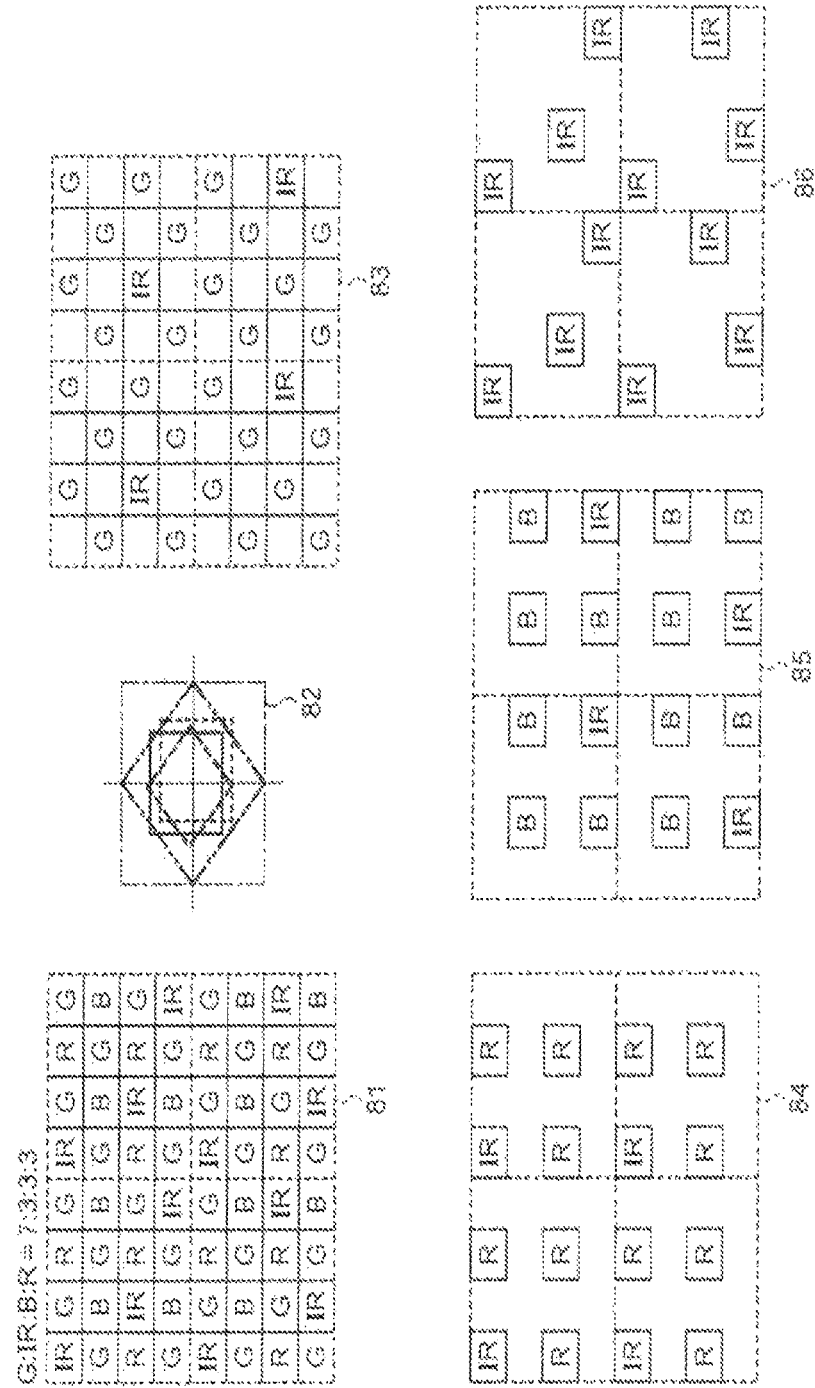
FIG. 9 is a view illustrating an example of color coding according to a third modified example.

FIG. 9 illustrates an example of color coding which uses the color coding illustrated in FIG. 8 while determining green G as a luminance main component in place of white W, and infrared light IR as a color component in place of green G. Accordingly, the color coding illustrated in FIG. 9 positions green G in place of white W in FIG. 8, and infrared light IR in place of green G in FIG. 8.

An arrangement example 81, a spatial frequency distribution 82, and arrangement examples 83 through 86 in FIG. 9 correspond to the arrangement example 71, the spatial frequency distribution 72, and the arrangement examples 73 through 76 illustrated in FIG. 8, respectively.

Accordingly, the color coding illustrated in FIG. 9 realizes highly sensitive imaging even in a dark place by utilizing infrared light illumination.

9. Fourth Embodiment

According to the example described above, the pixel number ratio of white W, green G, blue B, and red R is established as W:G:B:R=7:3:3:3, and arrangement of green G corresponding to the isolated points of white W and blue B in a unit of four rows in the checkered arrangement is shifted by a unit of two columns in the horizontal direction to increase dispersiveness (randomness) as illustrated in the arrangement example 73 (or 76) in FIG. 8. Similarly, green G corresponding to the isolated point of white W in a unit of four columns in the horizontal direction in the checkered arrangement may be shifted by a unit of two rows in the vertical direction to increase dispersiveness.

Figure 10:
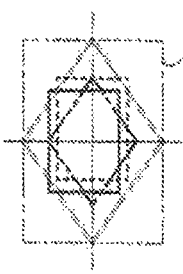
FIG. 10 is a view illustrating an example of color coding according to a configuration example of a fourth embodiment to which the present technology has been applied.

FIG. 10 illustrates an example of color coding which shifts arrangement of green G in a unit of four columns in the color coding illustrated in FIG. 6 in the vertical direction to increase dispersiveness (randomness). An arrangement example 101, a spatial frequency distribution 102, and arrangement examples 103 through 106 in FIG. 10 correspond to the arrangement example 41, the spatial frequency distribution 42, and the arrangement examples 43 through 46 illustrated in FIG. 6, respectively.

The color coding illustrated in FIG. 10 is different from the color coding illustrated in FIG. 6 in that two types of arrangement of green G, which is a color provided as isolated points for white W desired to be formed in the checkered pattern, are established in units of a column where green G is present, and disposed such that the two types are alternately positioned in the color coding.

More specifically, in the area of 4 pixels×4 pixels corresponding to each of four divisions produced by dividing the 8 pixels×8 pixels area into two parts in the horizontal direction and into two parts in the vertical direction, green G is positioned as an isolated point in a pixel in the second column from the left and in the second row from below in each of the areas of 4 pixels×4 pixels as illustrated in the arrangement example 41 in FIG. 6.

According to the color coding illustrated in FIG. 10, however, green G corresponding to the isolated point of white W is located at a pixel position in the second column from the left and in the second row from below in each of the two left side 4 pixels×4 pixels areas of the four divisions similarly to the example in FIG. 6. However, green G is positioned in a pixel in the second column from the left and in the uppermost row in each of the two right side 4 pixels×4 pixels areas of four divisions, as illustrated in the arrangement example 103.

In accordance with this arrangement, in the color coding illustrated in FIG. 10, green G corresponding to an isolated point of red R is located at a pixel position in the leftmost column and in the uppermost row in each of the two left side 4 pixels×4 pixels areas of the four divisions as illustrated in the arrangement example 104 similarly to the arrangement in FIG. 6. However, green G is positioned in a pixel in the leftmost column and in the second row from below in each of the two right side 4 pixels×4 pixels areas of the four divisions.

According to this arrangement, the arrangement of green G provided as isolated points for white W and red R desired to be formed is changed such that green G in a unit of 4 pixels×4 pixels (a unit of four columns) is alternately shifted by a unit of two rows in the vertical direction, as illustrated in the arrangement example 103. As a result, dispersiveness (randomness) of the positions of pixels of green G improves, wherefore a false color decreases. Generally, pixel signals are transferred in the vertical direction. In this case, so-called pixel addition for adding pixel signals in an identical color is allowed for transfer of pixel signals. Accordingly, when the mutual positional relationship between pixels of green G corresponding to isolated points for white W is uniform in the vertical direction as illustrated in the arrangement example 101 in FIG. 10, transfer of the pixel signals added in the same conditions is allowed. As a result, further reduction of a false color is achievable.

10. Fourth Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 11:
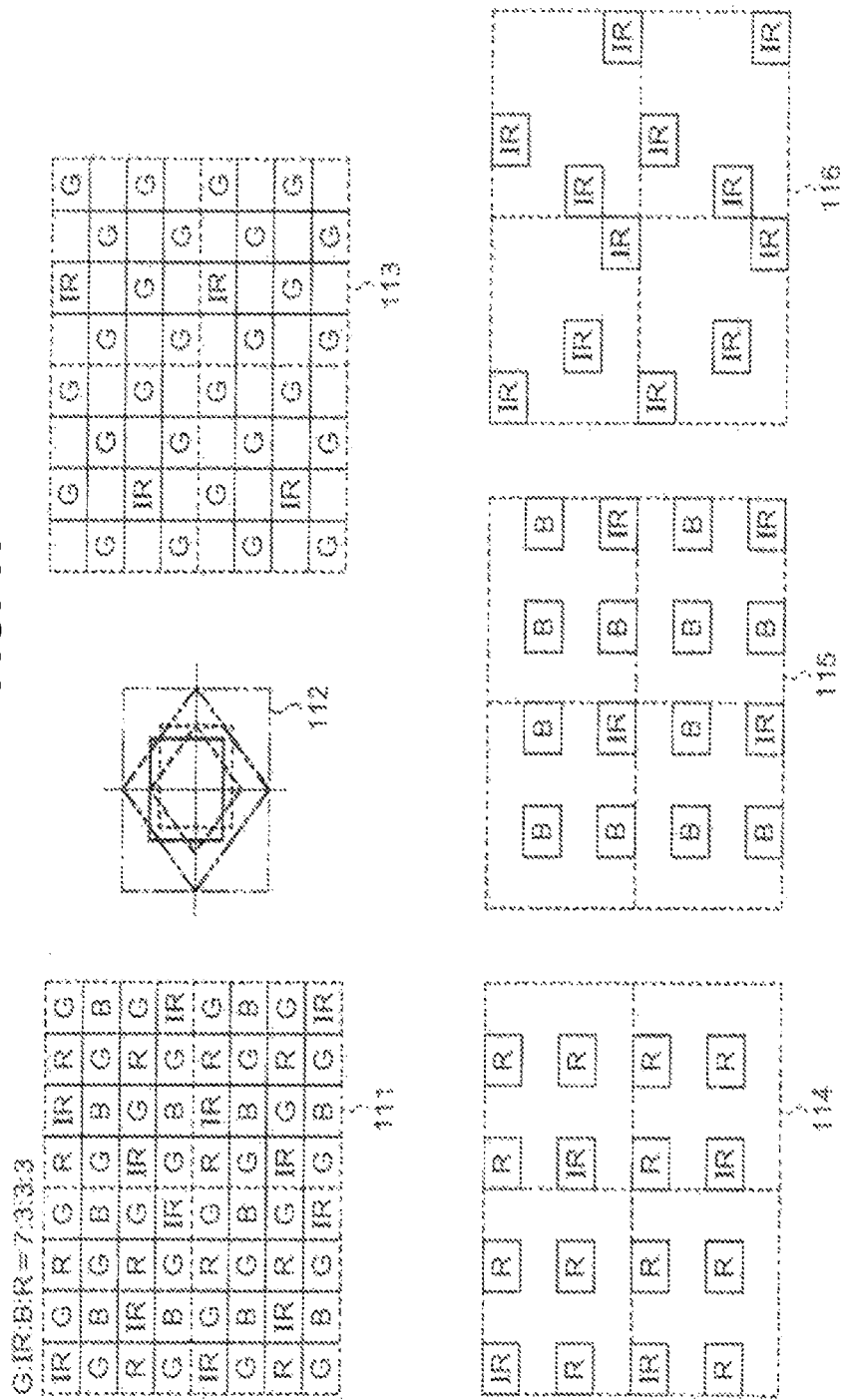
FIG. 11 is a view illustrating an example of color coding according to a fourth modified example.

FIG. 11 illustrates an example of color coding which uses the color coding illustrated in FIG. 10 while determining green G as a luminance main component in place of white W, and infrared light IR as a color component in place of green G. Accordingly, the color coding illustrated in FIG. 11 positions green G in place of white W in FIG. 10, and infrared light IR in place of green G in FIG. 10.

An arrangement example 111, a spatial frequency distribution 112, and arrangement examples 113 through 116 in FIG. 11 correspond to the arrangement example 101, the spatial frequency distribution 102, and the arrangement examples 103 through 106 illustrated in FIG. 10, respectively.

Accordingly, the color coding illustrated in FIG. 11 realizes highly sensitive imaging even in a dark place by utilizing infrared light illumination.

11. Fifth Embodiment

According to the example described above, the pixel number ratio of white WV green G, blue B, and red R is established as W:G:B:R=7:3:3:3, and arrangement of green G corresponding to the isolated points of white W in a unit of four columns is shifted by a unit of two rows in the vertical direction to increase dispersiveness (randomness) as illustrated in the arrangement example 113 in FIG. 10. However, one fourth of each of green G, blue B, and red R corresponding to color components may be lost in the 4 pixels×4 pixels area to equalize distribution of white W in the horizontal direction, vertical direction, and oblique directions.

Figure 12:
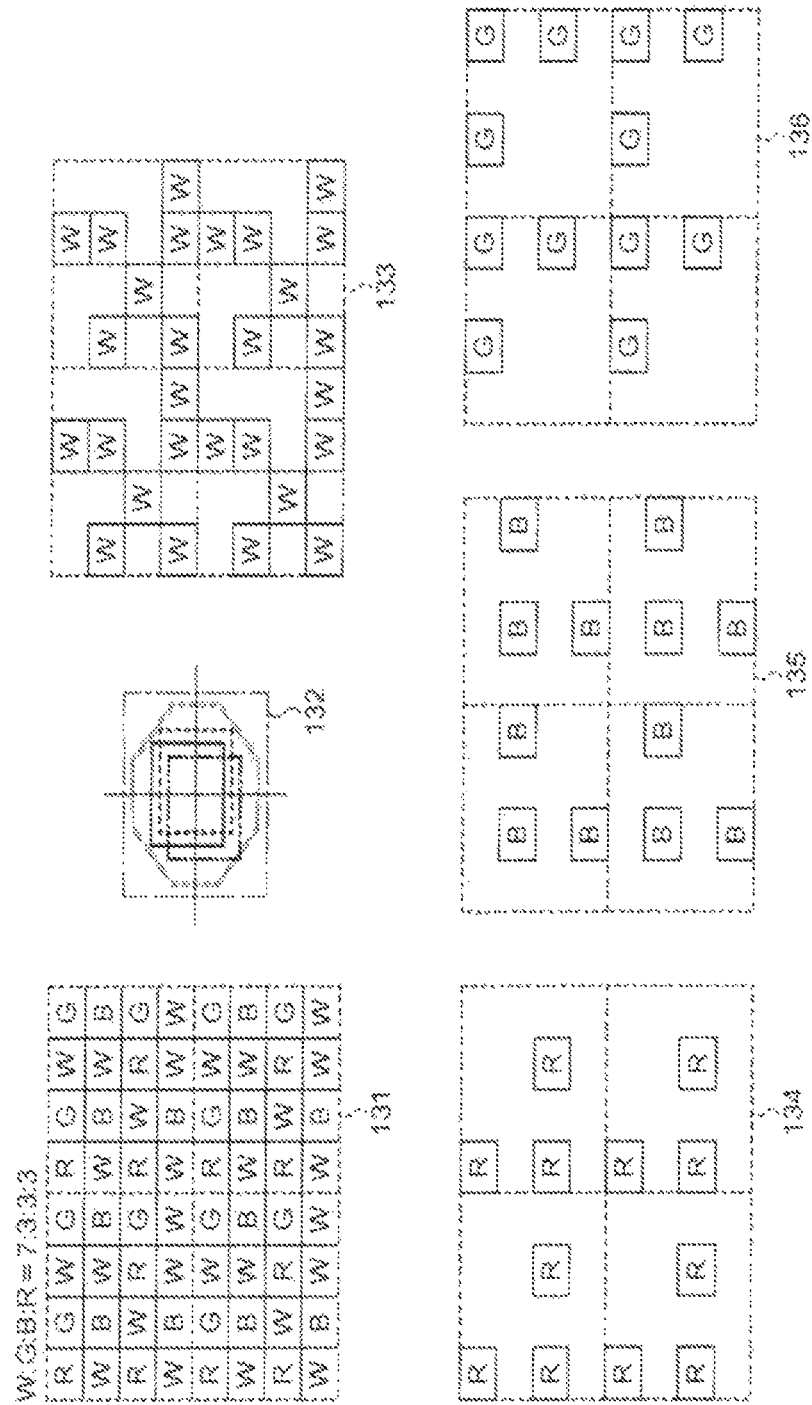
FIG. 12 is a view illustrating an example of color coding according to a configuration example of a fifth embodiment to which the present technology has been applied.

An arrangement example 131 illustrated in FIG. 12 is an example of color coding which arranges each of color components of green G, blue B, and red R at four vertexes of a square at positions of every other pixel within a 4 pixels×4 pixels area indicated by a dotted line, and loses one pixel at an identical position of the four vertexes for each of the squares of the same color to equalize distribution of white W in the horizontal direction, vertical direction, and oblique directions based on the lost one fourth of each color component.

More specifically, in an area of 4 pixels×4 pixels produced by dividing an area indicated by 8 pixels×8 pixels into two parts in the horizontal direction and into two parts in the vertical direction, red R corresponding to a color component is positioned in three pixels remaining after subtraction of a pixel in the uppermost row and in the second column from the right from four pixels in the uppermost row and in the second row from below, and in the second column from the right and the rightmost column as illustrated in an arrangement example 134. In this case, the pixel in the uppermost row and in the second column from the right is determined as a lost pixel of red R to which white W is given.

Blue B corresponding to a color component is positioned in three pixels remaining after subtraction of a pixel in the lowermost row and in the rightmost column from four pixels in the second row from above and in the lowermost row, and in the second column from the left and in the rightmost column, in an area of 4 pixels×4 pixels, as illustrated in an arrangement example 135. In this case, the pixel in the lowermost row and in the rightmost column is determined as a lost pixel of blue B to which white W is given.

Green G corresponding to a color component is positioned in three pixels remaining after subtraction of a pixel in the second row from below and in the second column from the left from four pixels in the uppermost row and in the second row from below, and in the second column from the left and in the rightmost column, in an area of 4 pixels×4 pixels, as illustrated in an arrangement example 136. In this case, the pixel in the second row from below and in the second column from the left is determined as a lost pixel of green G to which white W is given.

Other pixel positions are given white W as illustrated in the arrangement example 133.

According to this arrangement, white W corresponding to the luminance main component has distribution substantially equivalent to Nyquist frequency in the horizontal direction and the vertical direction, and in directions near these directions, and has the half distribution of Nyquist frequency in oblique directions at 45°, as illustrated in a spatial frequency distribution 132. On the other hand, each of green G, blue B, and red R corresponding to color components has the half distribution of Nyquist frequency in each of the horizontal direction, vertical direction, and oblique directions at 45°.

More specifically, in an area of 4 pixels×4 pixels produced by dividing an area indicated by 8 pixels×8 pixels into two parts in the horizontal direction and into two parts in the vertical direction as indicated by dotted lines in the arrangement examples 131 and 133 through 136 in FIG. 12, three pixels are positioned for each of green G, blue B, and red R corresponding to color components such that the same mutual positional relationship is established for the same color. In this case, one pixel having the same positional relationship is determined as a lost pixel to improve mutual balance. Accordingly, easy and appropriate interpolation for the lost pixel of green G, blue B, and red R is achievable. Moreover, white W positioned in the lost pixels realizes more uniform structure of the distribution of white W corresponding to the luminance main component in each of the horizontal direction, vertical direction, and the oblique directions.

As a result, loss of white W corresponding to the luminance main component decreases, wherefore luminance resolution improves.

Furthermore, three pixels are provided in the 4 pixels×4 pixels area for each of blue B, red R, and green G constituting color resolution. In this case, lowering of color resolution also decreases, wherefore further reduction of a false color is achievable.

12. Fifth Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

FIG. 13 illustrates an example of color coding which uses the color coding illustrated in FIG. 12 while determining green G as a luminance main component in place of white W, and infrared light IR as a color component in place of green G.

Accordingly, the color coding illustrated in FIG. 13 positions green G in place of white W in FIG. 12, and infrared light IR in place of green G in FIG. 12.

An arrangement example 141, a spatial frequency distribution 142, and arrangement examples 143 through 146 in FIG. 13 correspond to the arrangement example 131, the spatial frequency distribution 132, and the arrangement examples 133 through 136 illustrated in FIG. 12, respectively.

This structure realizes high resolution imaging even in a dark place by utilizing infrared light illumination.

The example of color coding illustrated in FIG. 13 is similar to the example of color coding illustrated in FIG. 12 except that white W and green G in FIG. 12 are replaced with green G and infrared light IR, respectively. Accordingly, the same explanation is not repeated herein.

13. Sixth Embodiment

According to the example described above, the pixel number ratio of white W, green G, blue B, and red R is established as W:G:B:R=7:3:3:3, and the color components are balanced by positioning three pixels for each of green G, blue B, and red R corresponding to color components such that the same positional relationship is established in each of 4 pixels×4 pixels areas, and positioning one pixel corresponding to a lost pixel for each color at an identical position for each area, as illustrated in the arrangement examples 134 through 136 in FIG. 12. According to the example in FIG. 12, the lost pixel of each of green G, blue B, and red R is located at the same position in the horizontal direction and the vertical direction. However, the lost pixel for each of green G, blue B, and red R may be located at a different position in the horizontal direction and the vertical direction to improve dispersiveness (randomness).

Figure 14:
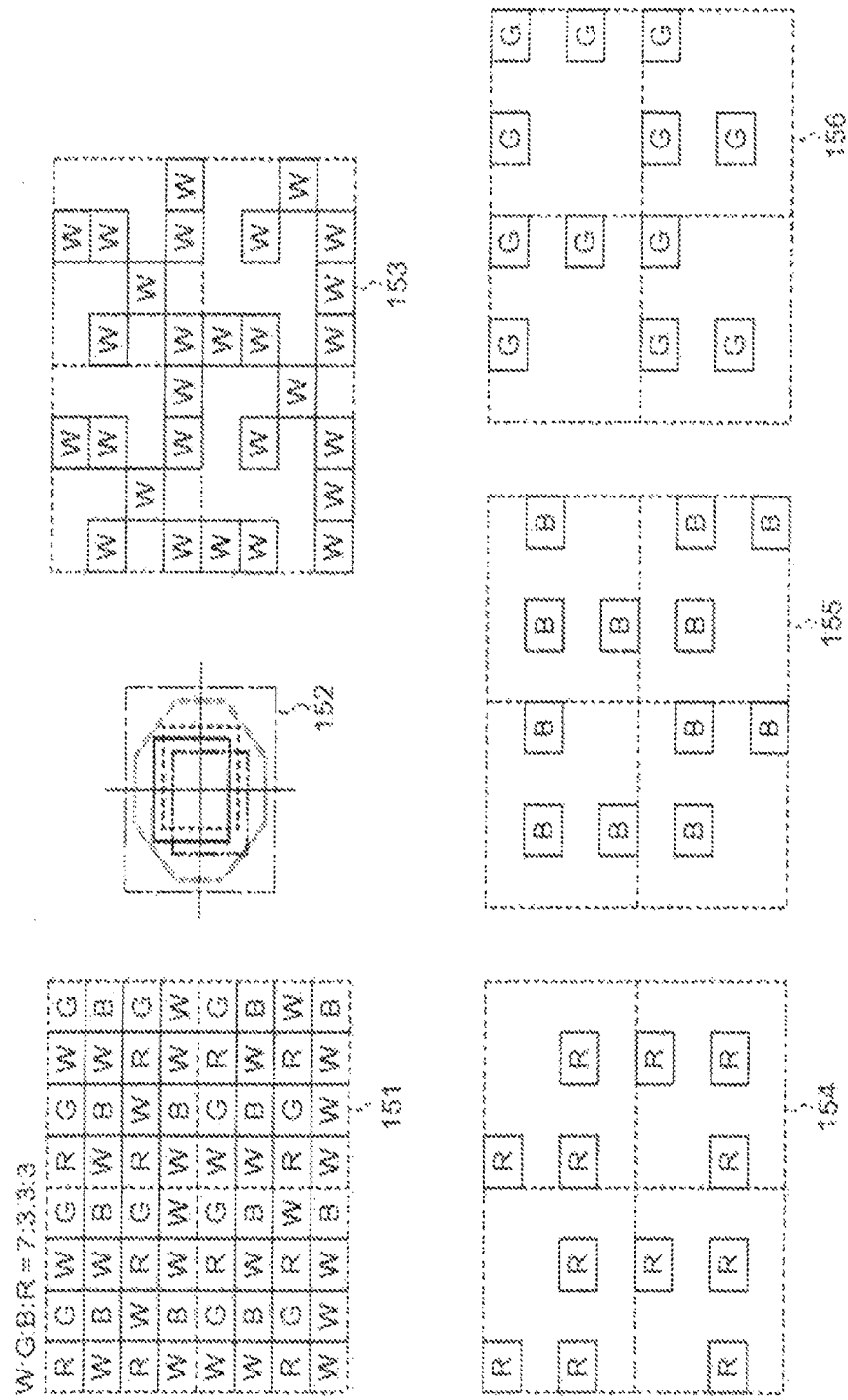
FIG. 14 is a view illustrating an example of color coding according to a configuration example of a sixth embodiment to which the present technology has been applied.

An arrangement example 151 illustrated in FIG. 14 is an example of color coding which varies the position of the lost pixel of each of green G, blue B, and red R illustrated in the arrangement example 131 in FIG. 12 to improve dispersiveness (randomness).

More specifically, white W positioned in the lost pixel of each of green G blue B, and red R in a unit of four rows is shifted by two columns in the horizontal direction as illustrated in arrangement examples 153 through 156 in FIG. 14.

In this case, the lost position of red R is located in a pixel in the uppermost row and in the second column from the right in each of two upper side 4 pixels×4 pixels areas. However, the lost position of red R is located in a pixel in the uppermost row and in the leftmost column in each of two lower side 4 pixels×4 pixels areas, as illustrated in the arrangement example 154. Similarly, the lost position of blue B is located in a pixel in the lowermost row and in the rightmost column in each of two upper side 4 pixels×4 pixels areas. However, the lost position of blue B is located in a pixel in the lowermost row and in the second column from the left in each of two lower side 4 pixels×4 pixels areas, as illustrated in the arrangement example 155. In addition, the lost position of green G is located in a pixel in the second row from below and in the second column from the left in each of two upper side 4 pixels×4 pixels areas. However, the lost position of green G is located in a pixel in the second row from below and in the rightmost column in each of two lower side 4 pixels×4 pixels areas, as illustrated in the arrangement example 156.

The spatial frequency distribution in the arrangement example 151 in FIG. 14 is similar to the spatial frequency distribution 132 as illustrated in the spatial frequency distribution 152. The spatial frequency distributions of the respective colors are similar to those of the arrangement example 131 in FIG. 12.

This arrangement improves dispersiveness (randomness) of positions of lost pixels for green G, blue B, and red R while maintaining balance of green G, blue B, and red R.

As a result, loss of white W corresponding to the luminance main component decreases, wherefore resolution improves.

Moreover, three pixels are provided for each of blue B, red IR and green G constituting color resolution in each of the 4 pixels×4 pixels areas. In this case, lowering of color resolution also decreases. Furthermore, dispersiveness (randomness) of the lost position of each of blue B, red R, and green G constituting color components improves in each of the 4 pixels×4 pixels areas. Accordingly, improvement of color resolution and reduction of a false color are achievable.

According to this example, the lost positions in a unit of four rows in the vertical direction in each of 4 pixels×4 pixels areas are alternately shifted by a unit of two columns in the horizontal direction for each of blue B, red R, and green G constituting color components. However, a unit of four columns in the horizontal direction may be shifted by a unit of two rows in the vertical direction, for example.

14. Sixth Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 15:
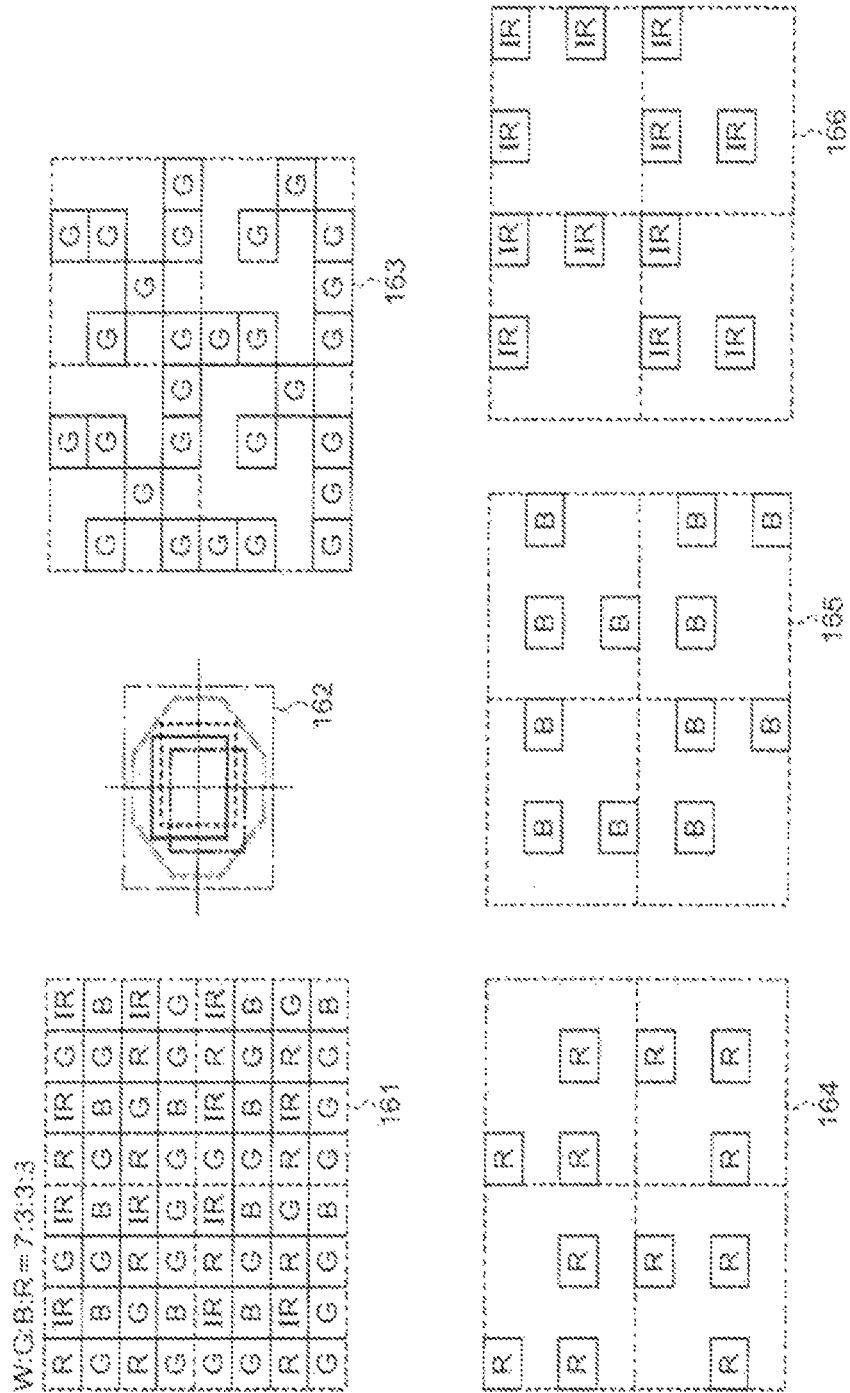
FIG. 15 is a view illustrating an example of color coding according to a sixth modified example.

FIG. 15 illustrates an example of color coding which uses the color coding illustrated in FIG. 14 while determining green G as a luminance main component in place of white W in the color coding in FIG. 14, and infrared light IR as a color component in place of green G in the color coding in FIG. 14.

Accordingly, the color coding illustrated in FIG. 15 positions green G in place of white W in FIG. 14, and infrared light IR in place of green G in FIG. 14.

An arrangement example 161, a spatial frequency distribution 162, and arrangement examples 163 through 166 in FIG. 15 correspond to the arrangement example 151, the spatial frequency distribution 152, and the arrangement examples 153 through 156 illustrated in FIG. 14, respectively.

This structure realizes high resolution imaging even in a dark place by utilizing infrared light illumination.

The example of color coding illustrated in FIG. 15 is similar to the example of color coding illustrated in FIG. 14 except that white W and green G in FIG. 14 are replaced with green G and infrared light IR, respectively. Accordingly, the same explanation is not repeated herein.

15. Seventh Embodiment

According to the first embodiment described above with reference to FIG. 4, the pixel number ratio of white W, green G, blue B, and red R is established as W:G:B:R=6:4:3:3, and green G, is not present in some of rows and columns. Accordingly, the spatial frequency distribution in the horizontal direction and the vertical direction is three fourths of the distribution of Nyquist frequency. However, green G may be present in all of rows and columns in the horizontal direction and vertical direction by applying the arrangement example illustrated in FIG. 4.

Figure 16:
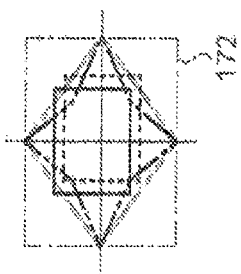
FIG. 16 is a view illustrating an example of color coding according to a configuration example of a seventh embodiment to which the present technology has been applied.

FIG. 16 illustrates an example of color coding which positions green G in all of row and columns in the horizontal direction and the vertical direction by switching between a part of green G and a part of white W arranged in the example of color coding according to the first embodiment described with reference to FIG. 4.

More specifically, the color coding according to a seventh embodiment illustrated in arrangement examples 171, 173, and 176 in FIG. 16 switches between green G positioned in a pixel in the rightmost column and in the uppermost row and white W positioned in a pixel in the second column from the right and in the second row from above in the 4 pixels×4 pixels area illustrated in the arrangement examples 11, 13, and 16 of the first embodiment in FIG. 4.

This arrangement of the color coding positions green G in each of rows and columns, thereby improving dispersiveness (randomness) of green G. As a result, the spatial frequency distribution of green G in the horizontal direction and the vertical direction becomes equivalent to Nyquist frequency as illustrated in the spatial frequency distribution 172.

More specifically, the arrangement example 171 illustrated in FIG. 16 establishes W:G:B:R:=6:4:3:3 by giving one white W pixel included in the W checkered array and W checkered G slant stripe array in FIG. 1 to each of red R and blue B, separating rows and columns containing red R from rows and columns containing blue B, determining a pixel located at a position easily interpolated for each of white W, red R, and blue B in the pixel arrangement, giving green G to the determined pixel, and increasing dispersiveness of green G.

In this case, rows and columns containing blue B are different from rows and columns containing red R. Accordingly, more easy and appropriate interpolation of pixel signals at the isolated points of blue B and red R is achievable at the time of demosaic. Moreover, dispersiveness of green G improves, whereby a false color decreases. Furthermore, white W formed in a checkered pattern by interpolation improves resolution and sensitivity.

As a result, improvement of sensitivity, luminance resolution, and color resolution is achievable.

The arrangement example 171, the spatial frequency distribution 172, and the arrangement examples 173 through 176 in FIG. 16 correspond to the arrangement example 11, the spatial frequency distribution 12, and the arrangement examples 13 through 16 illustrated in FIG. 4, respectively.

16. Seventh Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 17:
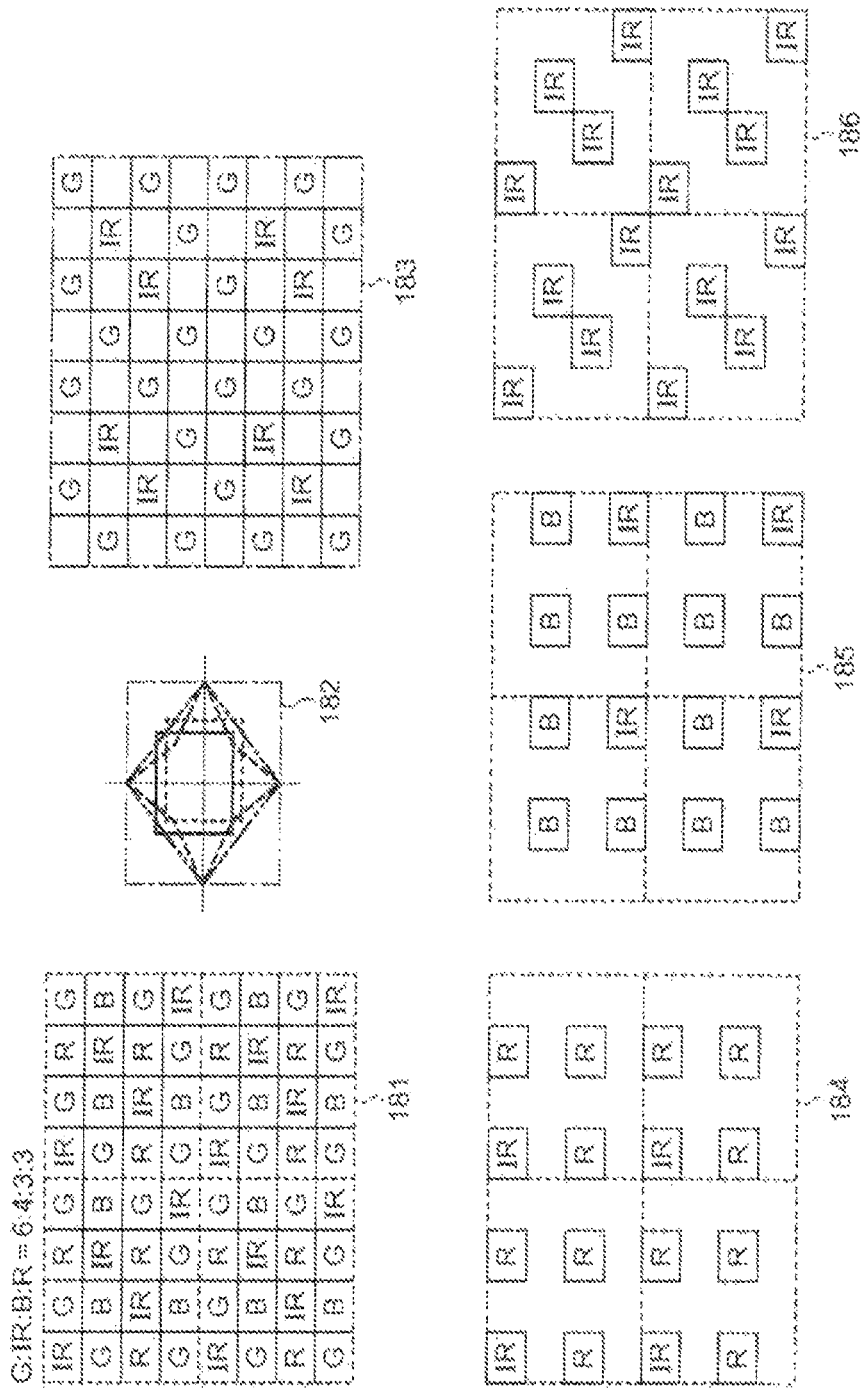
FIG. 17 is a view illustrating an example of color coding according to a seventh modified example.

FIG. 17 illustrates an example of color coding which uses the color coding illustrated in FIG. 16 while determining green G as a luminance main component in place of white W, and infrared light IR as a color component in place of green G.

Accordingly, the color coding illustrated in FIG. 17 positions green G in place of white W in FIG. 16, and infrared light IR in place of green G in FIG. 16.

An arrangement example 181, a spatial frequency distribution 182, and arrangement examples 183 through 186 in FIG. 17 correspond to the arrangement example 171, the spatial frequency distribution 172, and the arrangement examples 173 through 176 illustrated in FIG. 16, respectively.

This structure realizes high resolution imaging even in a dark place by utilizing infrared light illumination.

The example of color coding illustrated in FIG. 17 is similar to the example of color coding illustrated in FIG. 16 except that white W and green G in FIG. 16 are replaced with green G and infrared light IR, respectively. Accordingly, the same explanation is not repeated herein.

17. Eighth Embodiment

The color coding described with reference to FIG. 16 may improve the spatial frequency distribution of red R and blue B in the horizontal direction and the vertical direction, and dispersiveness of green G in the oblique directions at 45°.

Figure 18:
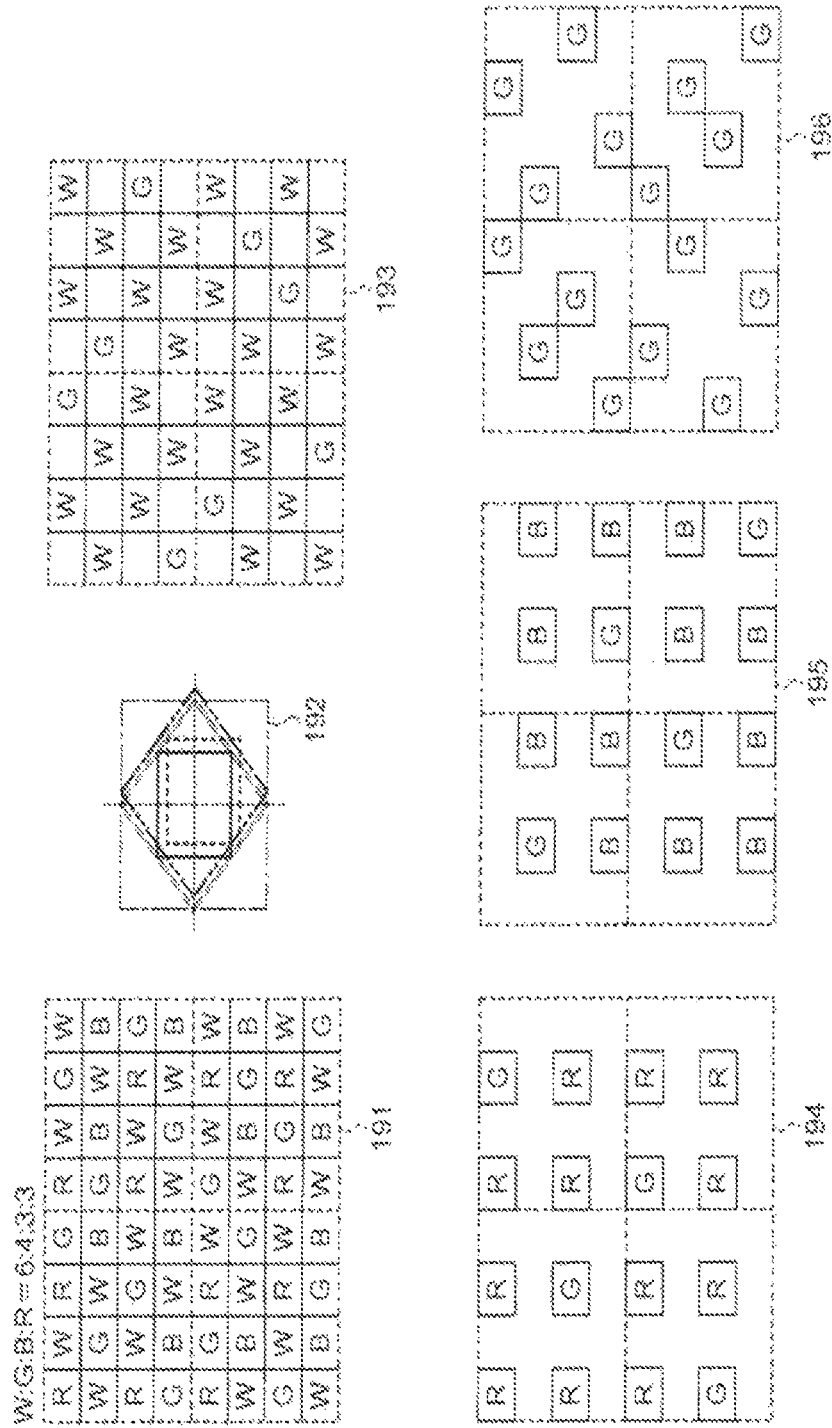
FIG. 18 is a view illustrating an example of color coding according to a configuration example of an eighth embodiment to which the present technology has been applied.

FIG. 18 illustrates an example of color coding arranged to improve the spatial frequency distribution for red R and blue B in the horizontal direction and the vertical direction, and increase dispersiveness of green G in the oblique directions at 45° in the example of the color coding according to the seventh embodiment described with reference to FIG. 16.

More specifically, green G corresponding to lost pixels of red R and blue B is present in all of rows and columns in the 8 pixels×8 pixels area as illustrated in arrangement examples 191, 194, and 195 in FIG. 18. Moreover, green G not corresponding to lost pixels is present at positions not continuing to (not adjacent to) switched pixels of green G corresponding to lost pixels of red R and blue B as illustrated in the arrangement examples 191, 193, 194, and 196.

This color coding positions green G in all rows in the oblique directions at 45° as well as in all of rows and columns as illustrated in the spatial frequency distribution 192. Accordingly, the spatial frequency distribution at the oblique directions at 45° improves, wherefore dispersiveness (randomness) of green G improves in comparison with the spatial frequency distribution 172. The distribution of the spatial frequency distribution 192 is calculated by approximation.

Improvement of dispersiveness of green G thus achieved further decreases a false color. Furthermore, white W formed in a checkered pattern by interpolation improves resolution and sensitivity.

As a result, improvement of sensitivity, luminance resolution, and color resolution is achievable.

18. Eighth Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 19:
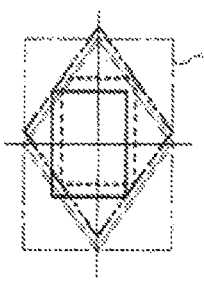
FIG. 19 is a view illustrating an example of color coding according to an eighth modified example.

FIG. 19 illustrates an example of color coding which uses the color coding illustrated in FIG. 18 while determining green G as a luminance main component in place of white W, and infrared light IR as a color component in place of green G.

Accordingly, the color coding illustrated in FIG. 19 positions green G in place of white W in FIG. 18, and infrared light IR in place of green G in FIG. 18.

An arrangement example 201, a spatial frequency distribution 202, and arrangement examples 203 through 206 in FIG. 19 correspond to the arrangement example 191, the spatial frequency distribution 192, and the arrangement examples 193 through 196 illustrated in FIG. 18, respectively.

This structure realizes high resolution imaging even in a dark place by utilizing infrared light illumination.

The example of color coding illustrated in FIG. 19 is similar to the example of color coding illustrated in FIG. 18 except that white W and green G in FIG. 18 are replaced with green G and infrared light IR, respectively. Accordingly, the same explanation is not repeated herein.

19. Ninth Embodiment

Dispersiveness in the oblique directions at 45° in the color coding according to the eighth embodiment described with reference to FIG. 18 may be improved by limiting the number of continuous pixels of green G in an identical direction to two pixels or smaller.

FIG. 20 illustrates an example of color coding arranged to improve dispersiveness in the example of color coding according to the eighth embodiment described with reference to FIG. 18 by limiting the number of continuous pixels of green G in an identical direction to two pixels or smaller.

More specifically, the number of pixels of green G continuing in each of the oblique directions at 45° (identical direction) in the 8 pixels×8 pixels area illustrated in FIG. 18 is limited to two pixels or smaller as illustrated in arrangement examples 221, 223, and 226 in FIG. 20. Moreover, green G corresponding to lost pixels is present in all of rows and columns in the arrangements of red R and blue B as illustrated in arrangement examples 224 and 225.

This color coding positions green G in all rows in the oblique directions at 45° as well as in all of rows and columns as illustrated in a spatial frequency distribution 222. In this case, the spatial frequency distribution in the oblique directions at 45° improves, wherefore dispersiveness (randomness) of green G increases. The distribution of the spatial frequency distribution 222 is calculated by approximation.

This structure improves dispersiveness of green G, and further improves oblique resolution. Accordingly, a false color further decreases. Furthermore, white W formed in a checkered pattern by interpolation improves resolution and sensitivity.

As a result, improvement of sensitivity, luminance resolution, and color resolution is achievable.

20. Ninth Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 21:
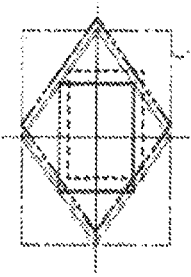
FIG. 21 is a view illustrating an example of color coding according to a ninth modified example.

FIG. 21 illustrates an example of color coding which uses the color coding illustrated in FIG. 20 while determining green G as a luminance main component in place of white W, and infrared light IR as a color component in place of green G.

Accordingly, the color coding illustrated in FIG. 21 positions green G in place of white W in FIG. 20, and infrared light IR in place of green G in FIG. 20.

An arrangement example 251, a spatial frequency distribution 252, and arrangement examples 253 through 256 in FIG. 21 correspond to the arrangement example 221, the spatial frequency distribution 222, and the arrangement examples 223 through 226 illustrated in FIG. 20, respectively.

This structure realizes high resolution imaging even in a dark place by utilizing infrared light illumination.

The example of color coding illustrated in FIG. 21 is similar to the example of color coding illustrated in FIG. 20 except that white W and green G in FIG. 20 are replaced with green G and infrared light IR, respectively. Accordingly, the same explanation is not repeated herein.

21. Tenth Embodiment

White W having a full wavelength band may be positioned at lost pixel positions of red R, green G, and blue B in the Bayer array having the pixel number ratio of white W, green G, blue B, and red R as W:G:R:B=6:4:3:3 to equalize spatial sampling of red R, green G, and blue B.

Figure 22:
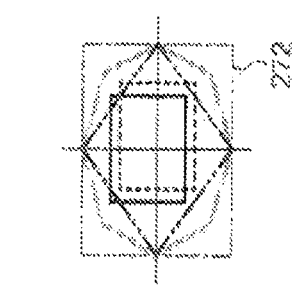
FIG. 22 is a view illustrating an example of color coding according to a configuration example of a tenth embodiment to which the present technology has been applied.

FIG. 22 illustrates an example of color coding which positions white W having a full wavelength band at lost pixel positions of red R, green G and blue B in the Bayer array to equalize spatial sampling of red R, green G, and blue B.

More specifically, white Wr and Wb are positioned at the lost pixel positions of red R and blue B, respectively, as illustrated in arrangement examples 271 and 273 through 276 in FIG. 22. This arrangement appropriately interpolates red R and blue B at the lost pixel positions. In FIG. 22, white Wr is white W corresponding to the lost pixel position of red R, while white Wb is white W corresponding to the lost pixel position of blue B.

Moreover, two pixels of green Gr and two pixels of Gb are given in each of rows and columns in the 8 pixels×8 pixels area as illustrated in arrangement examples 271 and 273 in FIG. 22. This arrangement improves uniformity of green G. In FIG. 22, green Gr is green G corresponding to a pixel at a position adjacent to red R in the horizontal direction, while green Gb is green G corresponding to a pixel at a position adjacent to blue B in the horizontal direction.

This structure improves dispersiveness of green G, wherefore a false color further decreases. Furthermore, white W formed in a checkered pattern by interpolation improves resolution and sensitivity.

Furthermore, white Wr corresponding to the lost pixel of red R is surrounded by blue B, green G, and white W in this arrangement. Accordingly, red R corresponding to the lost pixel is easily interpolated. Similarly, white Wb corresponding to the lost pixel of blue B is surrounded by red R, green G, and white W in this arrangement. Accordingly, blue B corresponding to the lost pixel is easily interpolated. In addition, the distribution of white W in the oblique directions at 45° improves as illustrated in a spatial frequency distribution 272. The spatial frequency distribution 272 in FIG. 22 is calculated by approximation.

As a result, improvement of sensitivity, luminance resolution, and color resolution is achievable.

22. Tenth Modified Example

According to the example described above, white W is determined as a luminance main component in the color coding using white W, green G, blue B, and red R. However, green G may be determined as a luminance main component in place of white W. In this case, infrared light IR may be used as a color component in place of green G for color coding.

Figure 23:
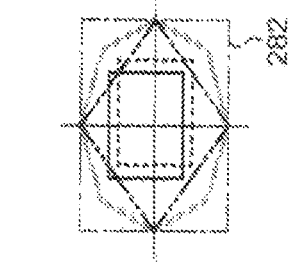
FIG. 23 is a view illustrating an example of color coding according to a tenth modified example.

FIG. 23 illustrates an example of color coding which uses the color coding illustrated in FIG. 22 while determining green G as a luminance main component in place of white W, and infrared light IR as a color component in place of green G.

In other words, FIG. 23 illustrates an example of color coding which uses the color coding illustrated in FIG. 22 while determining green G as the luminance main component and adding infrared IR.

Accordingly, the color coding illustrated in FIG. 23 positions green G in place of white W in FIG. 22, and infrared light IR in place of green G in FIG. 22.

An arrangement example 281, a spatial frequency distribution 282, and arrangement examples 283 through 286 in FIG. 23 correspond to the arrangement example 271, the spatial frequency distribution 272, and the arrangement examples 273 through 276 illustrated in FIG. 22, respectively.

This structure achieves imaging with high resolution even in a dark place by utilizing infrared light illumination.

The example of color coding illustrated in FIG. 23 is similar to the example of color coding illustrated in FIG. 22 except that white W and green G in FIG. 22 are replaced with green G and infrared light IR, respectively. Accordingly, the same explanation is not repeated herein.

23. Eleventh Embodiment

<Pixel Addition>

Pixel addition is hereinafter described with reference to FIG. 24.

Pixel values of pixel signals in an identical color may be added and processed in analog or digital to improve transfer efficiency of pixel signals, increase resolution and sensitivity, and reduce a false color.

Figure 24:
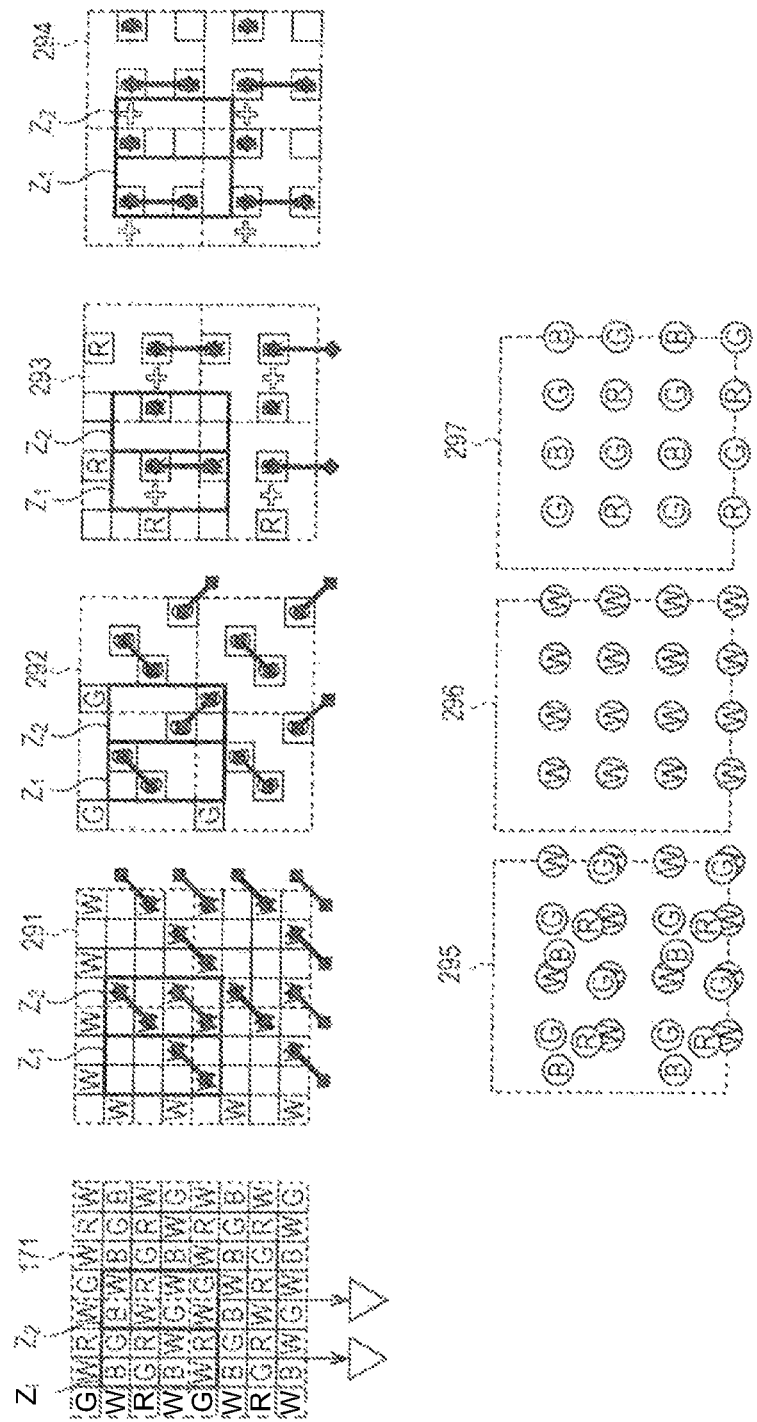
FIG. 24 is a view illustrating an example of color coding according to a configuration example of an eleventh embodiment to which the present technology has been applied.

More specifically, according to the arrangement example 171 (FIG. 16) shown in the left upper part in FIG. 24, pixel signals of each unit of eight pixels indicated by areas Z1 and Z2 are output via the common floating diffusion FD (FIG. 2) by using an amplifier including the common amplification transistor Tr3 (FIG. 2). While not shown in the figure, pixel signals of eight pixels in total indicated by two pixels (horizontal direction)×four pixels (vertical direction) adjacent to the areas Z1 and Z2 are similarly output by using a common amplifier in a similar range.

As a result, pixel values of adjoining white W in the oblique direction are added in analog within the range of the use of the common amplifier, and then amplified and output by the amplifier as illustrated in an addition example 291 in FIG. 24.

Moreover, pixel values of adjoining green G in the oblique direction within the range of the use of the common amplifier are added in analog, and then amplified and output by the amplifier as illustrated in an addition example 292.

Furthermore, pixel signals of pixels of red R and blue B present in the vertical direction are added in analog for each of red R and blue B within the areas Z1 and Z2 as the ranges of use of the common amplifier, as illustrated in addition examples 293 and 294. After the addition, signals for pixels present in the areas Z1 and Z2 and located at different positions in the horizontal direction are output as analog signals, and amplified by the amplifier. The signals thus amplified are digitized, and added in digital.

Pixel signals at the centers of gravity of the added pixels are calculated based on the pixel signals added and output in the manner discussed above to obtain respective colors of white W, green G, blue B, and red R desired to be formed as illustrated in a pixel center of gravity distribution 295.

In this case, each of green G, blue B, and red R is positioned similarly to the arrangement of the Bayer array as illustrated in the pixel center of gravity distribution 295.

Accordingly, white W is calculated by interpolation of the pixel signals at the lost positions as illustrated in an arrangement example 296. On the other hand, pixel positions and pixel signals in the Bayer arrangement are obtained for each of green G, blue B, and red R based on correlation processing for correlating with the obtained white W as illustrated in an arrangement example 297.

By utilizing the addition process, the transfer speed of pixel signals increases. In addition, improvement of luminance resolution, color resolution, and sensitivity, and reduction of a false color are achievable.

24. Twelfth Embodiment

<Application Example of SVE Control>

An application example of SVE (Spatially Varying Exposure) control is hereinafter described with reference to FIG. 25.

According to the foregoing examples, a uniform exposure time is set for each pixel. However, the exposure time may be varied for each pixel by utilizing SVE control at the time of imaging to expand a dynamic range.

For example, two types of exposure time, i.e., a short exposure time and a long exposure time are established for each pixel by utilizing SVE control for pixel arrangement illustrated in an arrangement example 311 (arrangement example 171 in FIG. 16) to expand a dynamic range and increase resolution.

More specifically, the arrangement example 311 indicated by 8 pixels×8 pixels contains short exposure time pixels in colored squares, and long exposure time pixels in colorless squares (pixels having exposure time similar to the exposure time of the foregoing examples). For controlling exposure time in units of pixel, a certain number of pixels need to be controlled in common to decrease the number of control conditions. Accordingly, exposure is herein controlled by a command which specifies three conditions for each row.

More specifically, white W and green G as relatively highly sensitive pixels are controlled with a common exposure time for each row. On the other hand, red R and blue B are individually controlled. Conditions shown in the left part of the arrangement example 311 include condition examples to control exposure for each row. Small letters in WGRB-wgrb shown in the left part of the arrangement example 311 indicate short exposure time pixels, while capital letters in WGRBwgrb indicate long exposure time pixels. According to this example, odd number columns from the left are expressed as 1, while even number columns are expressed as 2.

Accordingly, the uppermost row of the arrangement example 311 are divided into three conditions of two short exposure time green G pixels, two long exposure time red R pixels, and four short exposure time white W pixels. More specifically, the uppermost row of the arrangement example 311 contains three colors of green G, white W, and red R, and has three conditions "g1/R1/w2" constituted by "g1" for controlling two green G pixels with a short exposure time, "R1" for controlling two red R pixels with a long exposure time, and "w2" for controlling four white W pixels with a short exposure time.

The second row from above contains two white W pixels with a long time exposure, two green G pixels with a long exposure time, three blue B pixels with a long exposure time, and one blue B pixel with a short exposure time. In this case, four conditions are needed for individually controlling these pixels. However, white W and green G is controllable with a common exposure time. Accordingly, determined are three conditions "WG1/B2/b2" constituted by "WG1" for controlling two white W pixels and two green G pixels with a long exposure time. "B12" for controlling three blue B pixels with a long exposure time, and "b2" for controlling one blue B pixel with a short exposure time.

The third row from above contains three red R pixels with a short time exposure, one red R pixel with a long exposure time, two white W pixels with a short exposure time, and two green G pixels with a short exposure time. In this case, four conditions are needed for individually controlling these pixels. However, white W and green G is controllable with a common exposure time. Accordingly, determined are three conditions "r2/R2/wg2" constituted by "r2" for controlling three red R pixels with a short exposure time, "R2" for controlling one red R pixel with a long exposure time, and "wg2" for controlling two white W pixels and two green G pixels with a short exposure time.

The fourth row from above contains four white W pixels with a long time exposure, two blue B pixels with a short exposure time, and two green G pixels with a long exposure time. For individually controlling these pixels, determined are three conditions "W1/b2/G2" constituted by "W1" for controlling four white W pixels with a long exposure time, "b2" for controlling two blue B pixels with a short exposure time, and "G2" for controlling two green G pixels with a long exposure time.

The fourth row from below through the lowermost row are controlled similarly to the uppermost row through the fourth row from above.

According to this control, W:G:B:R:w:g:b:r=12:8:6:6:12:8:6:6 is established in the 8 pixels×8 pixels. In this case, improvement of color resolution and luminance resolution, and reduction of a false color are achievable. Moreover, the dynamic range expands.

The pixel arrangement in the foregoing color coding may be other arrays as long as the positional relationship between pixels is maintained. For example, the pixel arrangement may be a pixel array rotated through 45° from the foregoing arrangement. While four colors of white W, green G, blue B and red R are used in the foregoing examples, other colors may be adopted instead of these colors. For example, in case of four types of colors of light defined based on wavelengths, frequencies or the like, one color may have a wavelength containing luminance as a main component, while the other three colors may have wavelengths containing color components.

Embodiments according to the present technology are not limited to the embodiments described herein. Various modifications may be made without departing from the scope of the present technology.

The present technology may have the following configurations.

(1) A solid state imaging device including:
luminance pixels that detect light containing luminance as a main component;
first pixels that detect light having a first wavelength;
second pixels that detect light having a second wavelength; and
third pixels that detect light having a third wavelength, wherein
the first pixels and the second pixels are so arranged as to uniformly surround lost positions of the first pixels and the second pixels, respectively.

(2) The solid state imaging device according to (1), wherein the respective lost positions of the first pixels and the second pixels are arranged at equal intervals in both of a horizontal direction and a vertical direction, or in either the horizontal or the vertical direction.

(3) The solid state imaging device according to (1), wherein the luminance pixels are so arranged as to uniformly surround lost positions of the luminance pixels.

(4) The solid state imaging device according to (1), wherein the third pixels are randomly arranged.

(5) The solid state imaging device according to (1), wherein the luminance pixels, the first pixels, the second pixels, and the third pixels are arranged such that a pixel number ratio of the luminance pixels, the first pixels, the second pixels, and the third pixels becomes 6:4:3:3.

(6) The solid state imaging device according to (5), wherein the third pixels are arranged such that the same number of the third pixels are provided in each of rows and columns.

(7) The solid state imaging device according to (1), wherein the luminance pixels, the first pixels, the second pixels, and the third pixels are arranged such that a pixel number ratio of the luminance pixels, the first pixels, the second pixels, and the third pixels becomes 7:3:3:3.

(8) The solid state imaging device according to (1), wherein
pixel values of the luminance pixels positioned adjacent to each other in an oblique direction are added in analog and transferred,
pixel values of the third pixels positioned adjacent to each other in an oblique direction are added in analog and transferred,
pixel values of the first pixels positioned adjacent to each other in the vertical direction are added in analog and transferred, and
pixel values of the second pixels positioned adjacent to each other in the vertical direction are added in analog and transferred.

(9) The solid state imaging device according to (8), wherein the pixel values of the luminance pixels, the first pixels, the second pixels, and the third pixels are calculated based on mutual correlations at the centers of gravity of the respective pixels.

(10) The solid state imaging device according to (1), wherein a plurality of different exposure times are set for pixels included in the luminance pixels, in the first pixels, in the second pixels, and in the third pixels.

(11) The solid state imaging device according to (10), wherein a first exposure time and a second exposure time are set for pixels included in the luminance pixels, in the first pixels, in the second pixels, and in the third pixels.

(12) An imaging device including:
luminance pixels that detect light containing luminance as a main component;
first pixels that detect light having a first wavelength;
second pixels that detect light having a second wavelength; and
third pixels that detect light having a third wavelength, wherein
the first pixels and the second pixels are so arranged as to uniformly surround lost positions of the first pixels and the second pixels, respectively.

(13) An electronic device including:
luminance pixels that detect light containing luminance as a main component;
first pixels that detect light having a first wavelength;
second pixels that detect light having a second wavelength; and
third pixels that detect light having a third wavelength, wherein
the first pixels and the second pixels are so arranged as to uniformly surround lost positions of the first pixels and the second pixels, respectively.

REFERENCE SIGNS LIST

10 CMOS image sensor
11 Semiconductor substrate (sensor chip)
12 Pixel array unit
13 Vertical driving unit
14 Column processing unit
15 Horizontal driving unit
16 Conversion unit
17 System control unit
20 Color filter array

The invention claimed is:
1. A solid state imaging device, comprising:
luminance pixels that detect light containing luminance as a main component;

first pixels that detect light having a first wavelength;
second pixels that detect light having a second wavelength; and
third pixels that detect light having a third wavelength,
wherein the luminance pixels, the first pixels, the second pixels, and the third pixels are arranged such that a pixel number ratio of the luminance pixels, the first pixels, the second pixels, and the third pixels becomes 6:4:3:3, and
wherein the second pixels and third pixels are further arranged to uniformly surround lost positions of the second pixels and third pixels, respectively.

2. The solid state imaging device according to claim 1, wherein the respective lost positions of the second pixels and the third pixels are arranged at equal intervals in at least one of a horizontal direction or a vertical direction.

3. The solid state imaging device according to claim 1, wherein the luminance pixels are further arranged to uniformly surround lost positions of the luminance pixels.

4. The solid state imaging device according to claim 1, wherein the first pixels are randomly arranged.

5. The solid state imaging device according to claim 1, wherein the first pixels are further arranged such that a same number of the third pixels are in each of rows and columns.

6. The solid state imaging device according to claim 1, wherein
pixel values of the luminance pixels that are positioned adjacent to each other in an oblique direction are added in analog and transferred,
pixel values of the third pixels that are positioned adjacent to each other in the oblique direction are added in analog and transferred,
pixel values of the first pixels that are positioned adjacent to each other in a vertical direction are added in analog and transferred, and
pixel values of the second pixels that are positioned adjacent to each other in the vertical direction are added in analog and transferred.

7. The solid state imaging device according to claim 6, wherein pixel signals of the luminance pixels, the first pixels, the second pixels, and the third pixels are calculated based on the respective added pixel values.

8. The solid state imaging device according to claim 1, wherein a plurality of different exposure times are set for the luminance pixels, the first pixels, the second pixels, and the third pixels.

9. The solid state imaging device according to claim 8, wherein a first exposure time and a second exposure time of the plurality of different exposure times are set for the luminance pixels, the first pixels, the second pixels, and the third pixels.

10. A solid state imaging device, comprising:
luminance pixels that detect light containing luminance as a main component;
first pixels that detect light having a first wavelength;
second pixels that detect light having a second wavelength; and
third pixels that detect light having a third wavelength,
wherein the luminance pixels, the first pixels, the second pixels, and the third pixels are arranged such that a pixel number ratio of the luminance pixels, the first pixels, the second pixels, and the third pixels becomes 7:3:3:3, and
wherein the second pixels and third pixels are further arranged to uniformly surround lost positions of the second pixels and third pixels, respectively.

11. An imaging device, comprising:
luminance pixels that detect light containing luminance as a main component;
first pixels that detect light having a first wavelength;
second pixels that detect light having a second wavelength; and
third pixels that detect light having a third wavelength,
wherein the luminance pixels, the first pixels, the second pixels, and the third pixels are arranged such that a pixel number ratio of the luminance pixels, the first pixels, the second pixels, and the third pixels becomes 6:4:3:3, and
wherein the second pixels and third pixels are further arranged to uniformly surround lost positions of the second pixels and third pixels, respectively.

12. An electronic device, comprising:
luminance pixels that detect light containing luminance as a main component;
first pixels that detect light having a first wavelength;
second pixels that detect light having a second wavelength; and
third pixels that detect light having a third wavelength,
wherein the luminance pixels, the first pixels, the second pixels, and the third pixels are arranged such that a pixel number ratio of the luminance pixels, the first pixels, the second pixels, and the third pixels becomes 6:4:3:3, and
wherein the second pixels and third pixels are further arranged to uniformly surround lost positions of the second pixels and third pixels, respectively.

13. An imaging device, comprising:
luminance pixels that detect light containing luminance as a main component;
first pixels that detect light having a first wavelength;
second pixels that detect light having a second wavelength; and
third pixels that detect light having a third wavelength,
wherein the luminance pixels, the first pixels, the second pixels, and the third pixels are arranged such that a pixel number ratio of the luminance pixels, the first pixels, the second pixels, and the third pixels becomes 7:3:3:3, and
wherein the second pixels and third pixels are further arranged to uniformly surround lost positions of the second pixels and third pixels, respectively.

14. An electronic device, comprising:
luminance pixels that detect light containing luminance as a main component;
first pixels that detect light having a first wavelength;
second pixels that detect light having a second wavelength; and
third pixels that detect light having a third wavelength,
wherein the luminance pixels, the first pixels, the second pixels, and the third pixels are arranged such that a pixel number ratio of the luminance pixels, the first pixels, the second pixels, and the third pixels becomes 7:3:3:3, and
wherein the second pixels and third pixels are further arranged to uniformly surround lost positions of the second pixels and third pixels, respectively.

* * * * *